(12) United States Patent
Audet

(10) Patent No.: US 10,719,658 B2
(45) Date of Patent: Jul. 21, 2020

(54) METHOD OF DISPLAYING AXES OF DOCUMENTS WITH TIME-SPACES

(71) Applicant: 9224-5489 QUEBEC INC., Orford (CA)

(72) Inventor: Mathieu Audet, Montreal (CA)

(73) Assignee: 9224-5489 QUEBEC INC., Montreal, QC (CA)

( * ) Notice: Subject to any disclaimer, the term of this patent is extended or adjusted under 35 U.S.C. 154(b) by 0 days.

(21) Appl. No.: 16/543,566

(22) Filed: Aug. 18, 2019

(65) Prior Publication Data

US 2019/0377775 A1 Dec. 12, 2019

Related U.S. Application Data

(63) Continuation of application No. 14/930,744, filed on Nov. 3, 2015, now Pat. No. 10,430,495, which is a
(Continued)

(51) Int. Cl.
*G06F 40/103* (2020.01)
*G06F 16/29* (2019.01)
(Continued)

(52) U.S. Cl.
CPC .......... *G06F 40/103* (2020.01); *G06F 3/0482* (2013.01); *G06F 3/0485* (2013.01);
(Continued)

(58) Field of Classification Search
CPC ........ G06F 40/103; G06F 16/29; G06F 16/34; G06F 16/93; G06F 3/04817;
(Continued)

(56) References Cited

U.S. PATENT DOCUMENTS 4,616,336 A 10/1986 Robertson
4,653,021 A 3/1987 Takagi
(Continued)

FOREIGN PATENT DOCUMENTS

CA 2323268 4/2002
CA 2609837 12/2012
(Continued)

OTHER PUBLICATIONS

The lifestream approach to reorganizing the information world; Nicolas Carriero, Scott Fertig; Eric Freeman and David Gelernter; Apr. 1995; Yale University; United States.
(Continued)

*Primary Examiner* — Arpan P. Savla
*Assistant Examiner* — Haimei Jiang
(74) *Attorney, Agent, or Firm* — Mathieu Audet

(57) ABSTRACT

A method of presenting axes of documents along timelines on a display is displaying pluralities of documents with a plurality of time-spaces on a display, the documents being displayed along axes of documents adjacently displaying documents in a substantially rectilinear fashion on the display along a chronological order including a respective timelines representing a chronological order including a plurality of time units in respective time-spaces along the chronological order over a plurality of time units including a non-linear timescale and a time distribution that is substantially variable, with equal lengths of time not being visually represented with equal lengths of distance along the axes of documents, wherein the units of time of the plurality of time-spaces are chronologically of a different durations and at least one unit of time can be absent from the timelines.

20 Claims, 13 Drawing Sheets

Related U.S. Application Data continuation of application No. 13/798,969, filed on Mar. 13, 2013, now abandoned, which is a continuation of application No. 12/125,908, filed on May 22, 2008, now Pat. No. 8,601,392.

(60) Provisional application No. 61/034,625, filed on Mar. 7, 2008, provisional application No. 60/971,214, filed on Sep. 10, 2007, provisional application No. 60/957,444, filed on Aug. 22, 2007.

(51) Int. Cl.
  *G06F 16/34* (2019.01)
  *G06F 3/048* (2013.01)
  *G06F 16/904* (2019.01)
  *G06Q 10/10* (2012.01)
  *G06F 3/0481* (2013.01)
  *G06F 16/93* (2019.01)
  *G06F 3/0482* (2013.01)
  *G06F 3/0485* (2013.01)
  *G06F 3/0484* (2013.01)

(52) U.S. Cl.
  CPC ...... *G06F 3/04815* (2013.01); *G06F 3/04817* (2013.01); *G06F 3/04842* (2013.01); *G06F 16/29* (2019.01); *G06F 16/34* (2019.01); *G06F 16/93* (2019.01); *G06F 16/904* (2019.01); *G06Q 10/109* (2013.01)

(58) Field of Classification Search
  CPC ............. G06F 3/04842; G06F 3/04815; G06F 3/0482; G06F 3/0485; G06F 16/904; G06Q 10/109
  See application file for complete search history.

(56) References Cited

U.S. PATENT DOCUMENTS

| | | |
|---|---|---|
| 4,817,036 A | 3/1989 | Millett |
| 5,101,500 A | 3/1992 | Marui |
| 5,115,504 A | 5/1992 | Belove |
| 5,148,154 A | 9/1992 | MacKay |
| 5,241,624 A | 8/1993 | Torres |
| 5,261,087 A | 11/1993 | Mukaino |
| 5,312,478 A | 5/1994 | Reed |
| 5,337,405 A | 8/1994 | Lindauer |
| 5,353,391 A | 10/1994 | Cohen |
| 5,388,197 A | 2/1995 | Rayner |
| 5,398,074 A | 3/1995 | Duffield |
| 5,414,811 A | 5/1995 | Parulski |
| 5,499,330 A | 3/1996 | Lucas |
| 5,519,828 A | 5/1996 | Rayner |
| 5,524,195 A | 6/1996 | Clanton, III |
| 5,535,063 A | 7/1996 | Lamming |
| 5,537,524 A | 7/1996 | Aprile |
| 5,546,528 A | 8/1996 | Johnston |
| 5,581,752 A | 12/1996 | Inoue |
| 5,598,519 A | 1/1997 | Narayanan |
| 5,602,596 A | 2/1997 | Claussen |
| 5,606,374 A | 2/1997 | Bertram |
| 5,621,456 A | 4/1997 | Florin |
| 5,621,874 A | 4/1997 | Lucas |
| 5,623,588 A * | 4/1997 | Gould ................ G06F 3/04855 345/157 |
| 5,623,613 A | 4/1997 | Rowe |
| 5,634,064 A | 5/1997 | Warnock |
| 5,649,182 A | 7/1997 | Reitz |
| 5,659,742 A | 8/1997 | Beattie |
| 5,663,757 A | 9/1997 | Morales |
| 5,671,381 A | 9/1997 | Strasnick |
| 5,673,401 A | 9/1997 | Volk |
| 5,677,708 A | 10/1997 | Matthews, III |
| 5,680,605 A | 10/1997 | Torres |
| 5,682,511 A | 10/1997 | Sposato |
| 5,689,287 A | 11/1997 | Mackinlay |
| 5,701,500 A | 12/1997 | Ikeo |
| 5,713,031 A | 1/1998 | Saito |
| 5,740,815 A | 4/1998 | Alpins |
| 5,751,280 A * | 5/1998 | Abbott ............... H04N 7/17318 715/203 |
| 5,754,183 A | 5/1998 | Berend |
| 5,760,772 A | 6/1998 | Austin |
| 5,781,188 A | 7/1998 | Amiot |
| 5,781,785 A | 7/1998 | Rowe |
| 5,786,816 A | 7/1998 | Macrae |
| 5,794,178 A | 8/1998 | Caid |
| 5,798,766 A | 8/1998 | Hayashi |
| 5,812,124 A | 9/1998 | Eick |
| 5,822,751 A | 10/1998 | Gray |
| 5,832,504 A | 11/1998 | Tripathi |
| 5,838,317 A | 11/1998 | Bolnick |
| 5,838,320 A | 11/1998 | Matthews, III |
| 5,838,326 A | 11/1998 | Card |
| 5,838,966 A | 11/1998 | Harlan |
| 5,847,707 A | 12/1998 | Hayashida |
| 5,850,218 A | 12/1998 | LaJoie |
| 5,878,410 A | 3/1999 | Zbikowski |
| 5,880,729 A | 3/1999 | Johnston, Jr. |
| 5,900,879 A | 5/1999 | Berry |
| 5,903,271 A | 5/1999 | Bardon |
| 5,905,992 A | 5/1999 | Lucas |
| 5,920,859 A | 7/1999 | Li |
| 5,926,824 A | 7/1999 | Hashimoto |
| 5,933,843 A | 8/1999 | Takai |
| 5,956,708 A | 9/1999 | Dyko |
| 5,966,127 A | 10/1999 | Yajima |
| 5,974,391 A | 10/1999 | Hongawa |
| 5,977,974 A | 11/1999 | Hatori |
| 5,980,096 A | 11/1999 | Thalhammer-Reyero |
| 5,982,369 A | 11/1999 | Sciammarella |
| 5,999,173 A | 12/1999 | Ubillos |
| 6,003,034 A | 12/1999 | Tuli |
| 6,005,601 A | 12/1999 | Ohkura |
| 6,006,227 A | 12/1999 | Freeman |
| 6,009,442 A | 12/1999 | Chen |
| 6,012,072 A | 1/2000 | Lucas |
| 6,020,930 A | 2/2000 | Legrand |
| 6,023,703 A | 2/2000 | Hill |
| 6,028,600 A | 2/2000 | Rosin |
| 6,029,164 A | 2/2000 | Birrell |
| 6,037,933 A | 3/2000 | Blonstein |
| 6,038,522 A | 3/2000 | Manson |
| 6,061,062 A | 5/2000 | Venolia |
| 6,064,384 A | 5/2000 | Ho |
| 6,067,554 A | 5/2000 | Hohensee |
| 6,078,924 A | 6/2000 | Ainsbury |
| 6,081,817 A | 6/2000 | Taguchi |
| 6,088,032 A | 7/2000 | Mackinlay |
| 6,100,887 A | 8/2000 | Bormann |
| 6,108,657 A | 8/2000 | Shoup |
| 6,111,578 A | 8/2000 | Tesler |
| 6,119,120 A | 9/2000 | Miller |
| 6,149,519 A | 11/2000 | Osaki |
| 6,151,059 A | 11/2000 | Schein |
| 6,151,604 A | 11/2000 | Wlaschin |
| 6,151,702 A | 11/2000 | Overturf |
| 6,163,345 A | 12/2000 | Noguchi |
| 6,174,845 B1 | 1/2001 | Rattinger |
| 6,175,362 B1 | 1/2001 | Harms |
| 6,175,845 B1 | 1/2001 | Smith |
| 6,185,551 B1 | 2/2001 | Birrell |
| 6,188,406 B1 | 2/2001 | Fong |
| 6,189,012 B1 | 2/2001 | Mital |
| 6,202,068 B1 | 3/2001 | Kraay |
| 6,211,873 B1 | 4/2001 | Moyer |
| 6,236,994 B1 | 5/2001 | Swartz |
| 6,237,004 B1 | 5/2001 | Dodson |
| 6,240,421 B1 | 5/2001 | Stolarz |
| 6,243,093 B1 | 6/2001 | Czerwinski |
| 6,243,724 B1 | 6/2001 | Mander |
| 6,253,218 B1 * | 6/2001 | Aoki ....................... G06T 15/10 715/201 |

(56) References Cited

U.S. PATENT DOCUMENTS

| | | |
|---|---|---|
| 6,253,518 B1 | 7/2001 | Azar |
| 6,262,722 B1 | 7/2001 | Allison |
| 6,266,059 B1 | 7/2001 | Matthews, III |
| 6,266,098 B1 | 7/2001 | Cove |
| 6,275,229 B1 | 8/2001 | Weiner |
| 6,281,898 B1 | 8/2001 | Nikolovska |
| 6,281,940 B1 | 8/2001 | Sciammarella |
| 6,289,362 B1 | 9/2001 | Van Der Meer |
| 6,295,639 B1 | 9/2001 | Van Der Meer |
| 6,308,187 B1 | 10/2001 | DeStefano |
| 6,310,622 B1 | 10/2001 | Asente |
| 6,313,851 B1 | 11/2001 | Matthews, III |
| 6,317,761 B1 | 11/2001 | Landsman |
| 6,335,742 B1 | 1/2002 | Takemoto |
| 6,337,698 B1 | 1/2002 | Keely, Jr. |
| 6,338,044 B1 | 1/2002 | Cook |
| 6,344,880 B1 | 2/2002 | Takahashi |
| 6,351,765 B1 | 2/2002 | Pietropaolo |
| 6,353,436 B1 | 3/2002 | Reichlen |
| 6,353,831 B1 | 3/2002 | Gustman |
| 6,366,299 B1 | 4/2002 | Lanning |
| 6,380,953 B1 | 4/2002 | Mizuno |
| 6,381,362 B1 | 4/2002 | Deshpande |
| 6,388,665 B1 | 5/2002 | Linnett |
| 6,392,651 B1 | 5/2002 | Stradley |
| 6,418,556 B1 | 7/2002 | Bennington |
| 6,421,828 B1 | 7/2002 | Wakisaka |
| 6,425,129 B1 | 7/2002 | Sciammarella |
| 6,434,545 B1 | 8/2002 | MacLeod |
| 6,434,598 B1 | 8/2002 | Gish |
| 6,456,938 B1 | 9/2002 | Barnard |
| 6,457,006 B1 | 9/2002 | Gruenwald |
| 6,457,017 B2 | 9/2002 | Watkins |
| 6,463,431 B1 | 10/2002 | Schmitt |
| 6,466,237 B1 | 10/2002 | Miyao |
| 6,487,557 B1 | 11/2002 | Nagatomo |
| 6,491,585 B1 | 12/2002 | Miyamoto |
| 6,501,469 B1 | 12/2002 | MacPhail |
| 6,507,858 B1 | 1/2003 | Kanerva |
| 6,538,672 B1 | 3/2003 | Dobbelaar |
| 6,542,896 B1 | 4/2003 | Gruenwald |
| 6,553,310 B1 | 4/2003 | Lopke |
| 6,556,225 B1 | 4/2003 | MacPhail |
| 6,577,350 B1 | 6/2003 | Proehl |
| 6,581,068 B1 | 6/2003 | Bensoussan |
| 6,587,106 B1 | 7/2003 | Suzuki |
| 6,594,673 B1 | 7/2003 | Smith |
| 6,598,043 B1 | 7/2003 | Baclawski |
| 6,600,501 B1 | 7/2003 | Israel |
| D478,090 S | 8/2003 | Nguyen |
| 6,604,144 B1 | 8/2003 | Anders |
| 6,606,411 B1 | 8/2003 | Loui |
| 6,613,100 B2 | 9/2003 | Miller |
| 6,636,246 B1 | 10/2003 | Gallo |
| 6,638,313 B1 | 10/2003 | Freeman |
| 6,642,939 B1 | 11/2003 | Vallone |
| 6,650,343 B1 | 11/2003 | Fujita |
| 6,662,357 B1 | 12/2003 | Bowman-Amuah |
| 6,668,102 B2 | 12/2003 | Chiba |
| 6,671,692 B1 | 12/2003 | Marpe |
| 6,671,693 B1 | 12/2003 | Marpe |
| 6,671,694 B2 | 12/2003 | Baskins |
| 6,675,158 B1 | 1/2004 | Rising, III |
| 6,678,671 B1 | 1/2004 | Petrovic |
| 6,678,694 B1 | 1/2004 | Zimmermann |
| 6,678,891 B1 | 1/2004 | Wilcox |
| 6,684,249 B1 | 1/2004 | Frerichs |
| 6,690,391 B1 | 2/2004 | Proehl |
| 6,691,127 B1 | 2/2004 | Bauer |
| 6,694,326 B2 | 2/2004 | Mayhew |
| 6,694,335 B1 | 2/2004 | Hopmann |
| 6,694,486 B2 | 2/2004 | Frank |
| 6,701,318 B2 | 3/2004 | Fox |
| 6,704,727 B1 | 3/2004 | Kravets |
| 6,704,744 B1 | 3/2004 | Williamson |
| 6,721,760 B1 | 4/2004 | Ono |
| 6,725,232 B2 | 4/2004 | Bradley |
| 6,725,427 B2 | 4/2004 | Freeman |
| 6,735,591 B2 | 5/2004 | Khan |
| 6,738,787 B2 | 5/2004 | Stead |
| 6,744,447 B2 | 6/2004 | Estrada |
| 6,744,967 B2 | 6/2004 | Kaminski |
| 6,754,660 B1 | 6/2004 | MacPhail |
| 6,760,721 B1 | 7/2004 | Chasen |
| 6,768,999 B2 | 7/2004 | Prager |
| 6,772,148 B2 | 8/2004 | Baclawski |
| 6,859,803 B2 | 2/2005 | Dagtas |
| 6,862,027 B2 | 3/2005 | Andrews |
| 6,865,717 B2 | 3/2005 | Wright |
| 6,879,946 B2 | 4/2005 | Rong |
| 6,889,220 B2 | 5/2005 | Wolff |
| 6,900,807 B1 | 5/2005 | Liongosari |
| 6,901,558 B1 | 5/2005 | Andreas |
| 6,915,254 B1 | 7/2005 | Heinze |
| 6,915,489 B2 | 7/2005 | Gargi |
| 6,922,699 B2 | 7/2005 | Schuetze |
| 6,925,611 B2 | 8/2005 | SanGiovanni |
| 6,927,770 B2 | 8/2005 | Ording |
| 6,934,916 B1 | 8/2005 | Webb |
| 6,948,124 B2 | 9/2005 | Combs |
| 6,950,989 B2 | 9/2005 | Athsani |
| 6,961,900 B1 | 11/2005 | Sprague |
| 6,965,380 B1 | 11/2005 | Kumata |
| 6,973,628 B2 | 12/2005 | Asami |
| 6,983,227 B1 | 1/2006 | Thalhammer-Reyero |
| 6,985,948 B2 | 1/2006 | Taguchi |
| 6,987,220 B2 | 1/2006 | Holcombe |
| 6,990,637 B2 | 1/2006 | Anthony |
| 7,003,737 B2 | 2/2006 | Chiu |
| 7,007,034 B1 | 2/2006 | Hartman, Jr. |
| 7,010,744 B1 | 3/2006 | Torgerson |
| 7,013,258 B1 | 3/2006 | Su |
| 7,019,741 B2 | 3/2006 | Kelly |
| 7,020,848 B2 | 3/2006 | Rosenzweig |
| 7,054,878 B2 | 5/2006 | Gottsman |
| 7,055,104 B1 | 5/2006 | Billmaier |
| 7,075,550 B2 | 7/2006 | Bonadio |
| 7,080,394 B2 | 7/2006 | Istvan |
| 7,088,859 B1 | 8/2006 | Yamaguchi |
| 7,107,531 B2 | 9/2006 | Billmaier |
| 7,107,532 B1 | 9/2006 | Billmaier |
| 7,113,975 B2 | 9/2006 | Nakayama |
| 7,117,199 B2 | 10/2006 | Frank |
| 7,137,067 B2 | 11/2006 | Yanase |
| 7,139,006 B2 | 11/2006 | Wittenburg |
| 7,149,983 B1 | 12/2006 | Robertson |
| 7,155,675 B2 | 12/2006 | Billmaier |
| 7,159,177 B2 | 1/2007 | Billmaier |
| 7,199,809 B1 | 4/2007 | Lacy |
| 7,218,325 B1 * | 5/2007 | Buck .................. G06Q 30/06 345/440 |
| 7,220,910 B2 | 5/2007 | Plastina |
| 7,234,114 B2 | 6/2007 | Kurtz |
| 7,266,768 B2 | 9/2007 | Ferlitsch |
| 7,289,981 B2 | 10/2007 | Chang |
| 7,290,698 B2 | 11/2007 | Poslinski |
| 7,293,228 B1 | 11/2007 | Lessing |
| 7,302,649 B2 | 11/2007 | Ohnishi |
| 7,318,196 B2 | 1/2008 | Crow |
| 7,334,191 B1 | 2/2008 | Sivan |
| 7,336,279 B1 | 2/2008 | Takiguchi |
| 7,346,600 B2 | 3/2008 | Nakao |
| 7,346,850 B2 | 3/2008 | Swartz |
| 7,350,157 B1 | 3/2008 | Billmaier |
| 7,353,461 B2 | 4/2008 | Davidsson |
| 7,363,591 B2 | 4/2008 | Goldthwaite |
| 7,366,994 B2 | 4/2008 | Loui |
| 7,372,473 B2 * | 5/2008 | Venolia ................. G06F 3/0481 345/661 |
| 7,380,260 B1 | 5/2008 | Billmaier |
| 7,418,671 B2 | 8/2008 | Hama |
| 7,418,674 B2 | 8/2008 | Robbins |
| 7,426,057 B2 | 9/2008 | Mori |
| 7,444,598 B2 | 10/2008 | Horvitz |

(56) References Cited

U.S. PATENT DOCUMENTS

| | | |
|---|---|---|
| 7,447,713 B1 | 11/2008 | Berkheimer |
| 7,448,950 B2 | 11/2008 | Matsumoto |
| 7,458,033 B2 | 11/2008 | Bacigalupi |
| 7,461,088 B2 | 12/2008 | Thorman |
| 7,502,819 B2 | 3/2009 | Alonso |
| 7,594,246 B1 | 9/2009 | Billmaier |
| 7,606,819 B2 | 10/2009 | Audet |
| 7,607,104 B2 | 10/2009 | Maeda |
| 7,629,527 B2 | 12/2009 | Hiner |
| 7,650,569 B1 | 1/2010 | Allen |
| 7,661,075 B2 | 2/2010 | Lahdesmaki |
| 7,680,817 B2 | 3/2010 | Audet |
| 7,681,128 B2 | 3/2010 | Yamamoto |
| 7,681,149 B2 | 3/2010 | Lahdesmaki |
| 7,703,040 B2 | 4/2010 | Cutrell |
| 7,710,423 B2 | 5/2010 | Drucker |
| 7,714,859 B2 | 5/2010 | Shoemaker |
| 7,716,194 B2 | 5/2010 | Williams |
| 7,716,604 B2 | 5/2010 | Kataoka |
| 7,735,102 B1 | 6/2010 | Billmaier |
| 7,739,598 B2 | 6/2010 | Porter |
| 7,739,622 B2 | 6/2010 | DeLine |
| 7,757,253 B2 | 7/2010 | Rappaport |
| 7,761,471 B1 | 7/2010 | Lee |
| 7,765,184 B2 | 7/2010 | Makela |
| 7,765,195 B2 | 7/2010 | Miller |
| 7,770,117 B1 * | 8/2010 | Uy .................... G11B 27/34 715/722 |
| 7,770,217 B2 | 8/2010 | Pueblas |
| 7,788,247 B2 | 8/2010 | Wang |
| 7,788,592 B2 * | 8/2010 | Williams .............. G06F 16/58 715/764 |
| 7,792,328 B2 | 9/2010 | Albertson |
| 7,818,378 B2 | 10/2010 | Buchheit |
| 7,822,735 B2 | 10/2010 | Suda |
| 7,831,599 B2 | 11/2010 | Das |
| 7,844,074 B2 | 11/2010 | Moskowitz |
| 7,856,424 B2 | 12/2010 | Cisler |
| 7,870,489 B2 | 1/2011 | Serita |
| 7,899,818 B2 | 3/2011 | Stonehocker |
| 7,902,741 B2 | 3/2011 | Iwanaga |
| 7,949,691 B1 | 5/2011 | Franciscus de Heer |
| 7,962,522 B2 | 6/2011 | Norris, III |
| 7,991,720 B2 | 8/2011 | Mander |
| 8,001,481 B2 | 8/2011 | Al Chakra |
| 8,010,508 B2 | 8/2011 | Audet |
| 8,010,892 B2 | 8/2011 | Audet |
| 8,010,903 B2 | 8/2011 | Dieberger |
| 8,069,404 B2 | 11/2011 | Audet |
| 8,078,966 B2 | 12/2011 | Audet |
| 8,091,033 B2 | 1/2012 | von Sichart |
| 8,099,680 B1 | 1/2012 | Kolde |
| 8,136,030 B2 | 3/2012 | Audet |
| 8,151,185 B2 | 4/2012 | Audet |
| 8,306,982 B2 | 11/2012 | Audet |
| 8,307,355 B2 | 11/2012 | Capomassi |
| 8,316,306 B2 | 11/2012 | Audet |
| 8,341,194 B2 | 12/2012 | Gottsman |
| 8,438,188 B2 | 5/2013 | Norris, III |
| 8,468,467 B2 | 6/2013 | Yamashita |
| 8,601,392 B2 * | 12/2013 | Audet ................ G06F 3/04815 715/810 |
| 8,607,155 B2 | 12/2013 | Audet |
| 8,701,039 B2 | 4/2014 | Audet |
| 8,707,169 B2 | 4/2014 | Morita |
| 8,739,050 B2 | 5/2014 | Audet |
| 8,762,380 B2 | 6/2014 | Shirai |
| 8,788,937 B2 | 7/2014 | Audet |
| 8,826,123 B2 | 9/2014 | Audet |
| 8,930,895 B2 | 1/2015 | Drukman |
| 8,935,237 B2 | 1/2015 | Andersson |
| 8,984,417 B2 | 3/2015 | Audet |
| 9,058,093 B2 | 6/2015 | Audet |
| 9,081,498 B2 | 7/2015 | Thorsander |
| 9,122,374 B2 | 9/2015 | Audet |
| 9,189,129 B2 | 11/2015 | Cassistat |
| 9,262,381 B2 | 2/2016 | Audet |
| 9,348,800 B2 | 5/2016 | Audet |
| 9,519,693 B2 | 12/2016 | Audet |
| 9,529,495 B2 | 12/2016 | Cassistat |
| 9,588,646 B2 | 3/2017 | Cassistat |
| 2001/0003186 A1 | 6/2001 | DeStefano |
| 2001/0025288 A1 | 9/2001 | Yanase |
| 2001/0034766 A1 | 10/2001 | Morimoto |
| 2001/0055017 A1 | 12/2001 | Ording |
| 2002/0011990 A1 | 1/2002 | Anwar |
| 2002/0032696 A1 | 3/2002 | Takiguchi |
| 2002/0033848 A1 | 3/2002 | Sciammarella |
| 2002/0035563 A1 | 3/2002 | Suda |
| 2002/0052721 A1 | 5/2002 | Ruff |
| 2002/0056129 A1 | 5/2002 | Blackketter |
| 2002/0059215 A1 | 5/2002 | Kotani |
| 2002/0070958 A1 | 6/2002 | Yeo |
| 2002/0078440 A1 | 6/2002 | Feinberg |
| 2002/0087530 A1 | 7/2002 | Smith |
| 2002/0091739 A1 | 7/2002 | Ferlitsch |
| 2002/0096831 A1 | 7/2002 | Nakayama |
| 2002/0101458 A1 | 8/2002 | SanGiovanni |
| 2002/0105541 A1 | 8/2002 | Endou |
| 2002/0140719 A1 * | 10/2002 | Amir .................. H04N 21/8549 715/716 |
| 2002/0140740 A1 | 10/2002 | Chen |
| 2002/0143772 A1 | 10/2002 | Gottsman |
| 2002/0152474 A1 | 10/2002 | Dudkiewicz |
| 2002/0180795 A1 | 12/2002 | Wright |
| 2003/0001898 A1 | 1/2003 | Bernhardson |
| 2003/0001901 A1 | 1/2003 | Crinon |
| 2003/0030664 A1 | 2/2003 | Parry |
| 2003/0037051 A1 | 2/2003 | Gruenwald |
| 2003/0046693 A1 | 3/2003 | Billmaier |
| 2003/0046694 A1 | 3/2003 | Istvan |
| 2003/0046695 A1 | 3/2003 | Billmaier |
| 2003/0052900 A1 | 3/2003 | Card |
| 2003/0069893 A1 | 4/2003 | Kanai |
| 2003/0090504 A1 | 5/2003 | Brook |
| 2003/0090524 A1 | 5/2003 | Segerberg |
| 2003/0093260 A1 | 5/2003 | Dagtas |
| 2003/0093792 A1 | 5/2003 | Labeeb |
| 2003/0095149 A1 | 5/2003 | Fredriksson |
| 2003/0120681 A1 | 6/2003 | Baclawski |
| 2003/0120737 A1 | 6/2003 | Lytle |
| 2003/0121055 A1 | 6/2003 | Kaminski |
| 2003/0128228 A1 | 7/2003 | Crow |
| 2003/0132971 A1 | 7/2003 | Billmaier |
| 2003/0140023 A1 * | 7/2003 | Ferguson ............ G06Q 30/02 706/21 |
| 2003/0142136 A1 | 7/2003 | Carter |
| 2003/0149939 A1 | 8/2003 | Hubel |
| 2003/0156119 A1 | 8/2003 | Bonadio |
| 2003/0163468 A1 | 8/2003 | Freeman |
| 2003/0167902 A1 | 9/2003 | Hiner |
| 2003/0190950 A1 | 10/2003 | Matsumoto |
| 2003/0206201 A1 | 11/2003 | Ly |
| 2003/0237047 A1 | 12/2003 | Borson |
| 2004/0003398 A1 | 1/2004 | Donian |
| 2004/0024738 A1 | 2/2004 | Yamane |
| 2004/0054968 A1 | 3/2004 | Savage |
| 2004/0064473 A1 | 4/2004 | Thomas |
| 2004/0090439 A1 | 5/2004 | Dillner |
| 2004/0095376 A1 | 5/2004 | Graham |
| 2004/0111401 A1 | 6/2004 | Chang |
| 2004/0125143 A1 | 7/2004 | Deaton |
| 2004/0128277 A1 | 7/2004 | Mander |
| 2004/0128377 A1 | 7/2004 | Sadaghiany |
| 2004/0139143 A1 | 7/2004 | Canakapalli |
| 2004/0143598 A1 | 7/2004 | Drucker |
| 2004/0150657 A1 | 8/2004 | Wittenburg |
| 2004/0160416 A1 | 8/2004 | Venolia |
| 2004/0163049 A1 | 8/2004 | Mori |
| 2004/0172593 A1 | 9/2004 | Wong |
| 2004/0177319 A1 | 9/2004 | Horn |
| 2004/0189827 A1 | 9/2004 | Kim |
| 2004/0233238 A1 | 11/2004 | Lahdesmaki |

(56) References Cited

U.S. PATENT DOCUMENTS

| | | | |
|---|---|---|---|
| 2004/0233239 A1* | 11/2004 | Landesmaki | G09G 5/003 715/810 |
| 2004/0263519 A1 | 12/2004 | Andrews | |
| 2005/0022132 A1 | 1/2005 | Herzberg | |
| 2005/0060343 A1 | 3/2005 | Gottsman | |
| 2005/0060667 A1 | 3/2005 | Robbins | |
| 2005/0108644 A1 | 5/2005 | Finke-Anlauff | |
| 2005/0119936 A1 | 6/2005 | Buchanan | |
| 2005/0131959 A1 | 6/2005 | Thorman | |
| 2005/0138066 A1 | 6/2005 | Finke-Anlauff | |
| 2005/0210410 A1 | 9/2005 | Ohwa | |
| 2005/0234843 A1 | 10/2005 | Beckius | |
| 2005/0262533 A1 | 11/2005 | Hart | |
| 2005/0268237 A1* | 12/2005 | Crane | G06Q 10/107 715/732 |
| 2005/0268254 A1 | 12/2005 | Abramson | |
| 2005/0289482 A1* | 12/2005 | Anthony | G06F 16/168 715/851 |
| 2006/0000484 A1 | 1/2006 | Romanchik | |
| 2006/0004848 A1 | 1/2006 | Williams | |
| 2006/0013554 A1 | 1/2006 | Poslinski | |
| 2006/0013555 A1 | 1/2006 | Poslinski | |
| 2006/0013556 A1 | 1/2006 | Poslinski | |
| 2006/0013557 A1 | 1/2006 | Poslinski | |
| 2006/0020966 A1 | 1/2006 | Poslinski | |
| 2006/0020971 A1 | 1/2006 | Poslinski | |
| 2006/0026170 A1 | 2/2006 | Kreitler | |
| 2006/0041521 A1 | 2/2006 | Oral | |
| 2006/0045470 A1 | 3/2006 | Poslinski | |
| 2006/0048043 A1 | 3/2006 | Kikuchi | |
| 2006/0048076 A1 | 3/2006 | Vronay | |
| 2006/0075338 A1 | 4/2006 | Kusakabe | |
| 2006/0095857 A1* | 5/2006 | Torvinen | G06Q 10/10 715/764 |
| 2006/0107096 A1 | 5/2006 | Findleton | |
| 2006/0116994 A1 | 6/2006 | Jonker | |
| 2006/0136246 A1 | 6/2006 | Tu | |
| 2006/0136466 A1 | 6/2006 | Weiner | |
| 2006/0136839 A1 | 6/2006 | Makela | |
| 2006/0143574 A1 | 6/2006 | Ito | |
| 2006/0155757 A1 | 7/2006 | Williams | |
| 2006/0156246 A1* | 7/2006 | Williams | G06F 16/58 715/764 |
| 2006/0161867 A1 | 7/2006 | Drucker | |
| 2006/0197782 A1 | 9/2006 | Sellers | |
| 2006/0200475 A1 | 9/2006 | Das | |
| 2006/0209069 A1 | 9/2006 | Bacigalupi | |
| 2006/0236251 A1 | 10/2006 | Kataoka | |
| 2006/0241952 A1 | 10/2006 | Loduha | |
| 2006/0242178 A1 | 10/2006 | Butterfield | |
| 2006/0248129 A1 | 11/2006 | Carnes | |
| 2006/0259511 A1 | 11/2006 | Boerries | |
| 2006/0271884 A1 | 11/2006 | Hurst | |
| 2006/0277478 A1 | 12/2006 | Seraji | |
| 2006/0277496 A1 | 12/2006 | Bier | |
| 2007/0005576 A1 | 1/2007 | Cutrell | |
| 2007/0007884 A1 | 1/2007 | Iwanaga | |
| 2007/0011150 A1 | 1/2007 | Frank | |
| 2007/0024722 A1 | 2/2007 | Eura | |
| 2007/0061745 A1 | 3/2007 | Anthony | |
| 2007/0061855 A1 | 3/2007 | Serita | |
| 2007/0067290 A1 | 3/2007 | Makela | |
| 2007/0076984 A1 | 4/2007 | Takahashi | |
| 2007/0083505 A1 | 4/2007 | Ferrari | |
| 2007/0083527 A1 | 4/2007 | Wadler | |
| 2007/0094615 A1 | 4/2007 | Endo | |
| 2007/0100842 A1 | 5/2007 | Wykes | |
| 2007/0118520 A1 | 5/2007 | Bliss | |
| 2007/0120856 A1* | 5/2007 | De Ruyter | G06Q 10/109 345/440 |
| 2007/0136687 A1 | 6/2007 | Pak | |
| 2007/0143803 A1 | 6/2007 | Lim | |
| 2007/0156654 A1 | 7/2007 | Ravinarayanan | |
| 2007/0168877 A1 | 7/2007 | Jain | |
| 2007/0171224 A1* | 7/2007 | MacPherson | G06F 3/0481 345/440 |
| 2007/0185826 A1 | 8/2007 | Brice | |
| 2007/0192749 A1 | 8/2007 | Baudisch | |
| 2007/0204218 A1 | 8/2007 | Weber | |
| 2007/0208679 A1 | 9/2007 | Tseng | |
| 2007/0214169 A1 | 9/2007 | Audet | |
| 2007/0216694 A1 | 9/2007 | Audet | |
| 2007/0220209 A1 | 9/2007 | Maeda | |
| 2007/0239676 A1 | 10/2007 | Stonehocker | |
| 2007/0268522 A1 | 11/2007 | Miyamoto | |
| 2007/0271508 A1 | 11/2007 | Audet | |
| 2007/0272508 A1 | 11/2007 | Toya | |
| 2008/0000126 A1 | 1/2008 | Teza | |
| 2008/0010605 A1 | 1/2008 | Frank | |
| 2008/0015911 A1 | 1/2008 | Wang | |
| 2008/0016142 A1 | 1/2008 | Schneider | |
| 2008/0019371 A1 | 1/2008 | Anschutz | |
| 2008/0022199 A1 | 1/2008 | Sako | |
| 2008/0024444 A1 | 1/2008 | Abe | |
| 2008/0040665 A1 | 2/2008 | Waldeck | |
| 2008/0046844 A1 | 2/2008 | Sugie | |
| 2008/0058106 A1 | 3/2008 | Audet | |
| 2008/0059897 A1 | 3/2008 | Dilorenzo | |
| 2008/0065995 A1 | 3/2008 | Bell | |
| 2008/0071822 A1 | 3/2008 | Audet | |
| 2008/0072169 A1 | 3/2008 | Audet | |
| 2008/0077756 A1 | 3/2008 | Shibata | |
| 2008/0092038 A1 | 4/2008 | Audet | |
| 2008/0098323 A1 | 4/2008 | Vallone | |
| 2008/0104227 A1 | 5/2008 | Birnie | |
| 2008/0104534 A1 | 5/2008 | Park | |
| 2008/0111826 A1 | 5/2008 | Endrikhovski | |
| 2008/0118219 A1 | 5/2008 | Chang | |
| 2008/0120571 A1 | 5/2008 | Chang | |
| 2008/0133579 A1 | 6/2008 | Lim | |
| 2008/0134013 A1 | 6/2008 | Audet | |
| 2008/0134022 A1 | 6/2008 | Audet | |
| 2008/0140448 A1 | 6/2008 | Hernandez | |
| 2008/0141115 A1 | 6/2008 | Audet | |
| 2008/0155474 A1 | 6/2008 | Duhig | |
| 2008/0163048 A1 | 7/2008 | Gossweiler, III | |
| 2008/0174790 A1 | 7/2008 | Noguchi | |
| 2008/0184285 A1 | 7/2008 | Park | |
| 2008/0186305 A1 | 8/2008 | Carter | |
| 2008/0243778 A1 | 10/2008 | Behnen | |
| 2008/0244437 A1 | 10/2008 | Fischer | |
| 2008/0256473 A1 | 10/2008 | Chakra | |
| 2008/0256474 A1 | 10/2008 | Chakra | |
| 2008/0270361 A1 | 10/2008 | Meyer | |
| 2008/0270886 A1* | 10/2008 | Gossweiler | H04N 21/26283 715/227 |
| 2008/0270928 A1 | 10/2008 | Chakra | |
| 2008/0276178 A1 | 11/2008 | Fadell | |
| 2008/0282198 A1 | 11/2008 | Brooks | |
| 2008/0294651 A1 | 11/2008 | Masuyama | |
| 2008/0295016 A1* | 11/2008 | Audet | G06F 16/93 715/772 |
| 2008/0295036 A1 | 11/2008 | Ikeda | |
| 2008/0298697 A1 | 12/2008 | Lee | |
| 2008/0299989 A1 | 12/2008 | King | |
| 2008/0301562 A1 | 12/2008 | Berger | |
| 2008/0307343 A1 | 12/2008 | Robert | |
| 2008/0307348 A1 | 12/2008 | Jones | |
| 2009/0018996 A1 | 1/2009 | Hunt | |
| 2009/0019371 A1 | 1/2009 | Audet | |
| 2009/0033664 A1 | 2/2009 | Hao | |
| 2009/0048981 A1 | 2/2009 | McBain Millan | |
| 2009/0055413 A1 | 2/2009 | Audet | |
| 2009/0055726 A1 | 2/2009 | Audet | |
| 2009/0055729 A1 | 2/2009 | Audet | |
| 2009/0055763 A1 | 2/2009 | Audet | |
| 2009/0055776 A1 | 2/2009 | Audet | |
| 2009/0063552 A1 | 3/2009 | Jones | |
| 2009/0064029 A1 | 3/2009 | Corkran | |
| 2009/0064143 A1 | 3/2009 | Bhogal | |
| 2009/0070662 A1 | 3/2009 | Audet | |
| 2009/0070699 A1 | 3/2009 | Birkill | |
| 2009/0083260 A1 | 3/2009 | Artom | |

(56) References Cited

U.S. PATENT DOCUMENTS

| | | |
|---|---|---|
| 2009/0083859 A1 | 3/2009 | Roth |
| 2009/0106684 A1 | 4/2009 | Chakra |
| 2009/0106685 A1 | 4/2009 | Care |
| 2009/0113334 A1 | 4/2009 | Chakra |
| 2009/0116817 A1 | 5/2009 | Kim |
| 2009/0132952 A1 | 5/2009 | Wong |
| 2009/0150832 A1 | 6/2009 | Keller |
| 2009/0164933 A1 | 6/2009 | Pederson |
| 2009/0177754 A1 | 7/2009 | Brezina |
| 2009/0199119 A1 | 8/2009 | Park |
| 2009/0199302 A1 | 8/2009 | So |
| 2009/0210862 A1* | 8/2009 | Viswanadha ....... G06F 11/3664 717/125 |
| 2009/0217204 A1 | 8/2009 | Yamashita |
| 2009/0228774 A1 | 9/2009 | Matheny |
| 2009/0228788 A1 | 9/2009 | Audet |
| 2009/0235194 A1 | 9/2009 | Arndt |
| 2009/0254850 A1 | 10/2009 | Almeida |
| 2009/0265372 A1 | 10/2009 | Esmann-Jensen |
| 2009/0276733 A1 | 11/2009 | Manyam |
| 2009/0284658 A1 | 11/2009 | Cho |
| 2009/0287693 A1 | 11/2009 | Audet |
| 2009/0288006 A1* | 11/2009 | Audet ..................... G07F 17/32 715/716 |
| 2009/0307629 A1 | 12/2009 | Horiuchi |
| 2009/0319933 A1 | 12/2009 | Zaika |
| 2009/0322756 A1 | 12/2009 | Robertson |
| 2010/0023500 A1 | 1/2010 | Bascom |
| 2010/0057576 A1 | 3/2010 | Brodersen |
| 2010/0058226 A1 | 3/2010 | Flake |
| 2010/0070919 A1 | 3/2010 | Araumi |
| 2010/0077355 A1 | 3/2010 | Belinsky |
| 2010/0082427 A1 | 4/2010 | Burgener |
| 2010/0082653 A1 | 4/2010 | Nair |
| 2010/0083159 A1 | 4/2010 | Mountain |
| 2010/0094890 A1 | 4/2010 | Bokor |
| 2010/0110228 A1 | 5/2010 | Ozawa |
| 2010/0145976 A1 | 6/2010 | Higgins |
| 2010/0146380 A1 | 6/2010 | Rousso |
| 2010/0150522 A1 | 6/2010 | Schmehl |
| 2010/0169823 A1 | 7/2010 | Audet |
| 2010/0171861 A1 | 7/2010 | Ota |
| 2010/0185509 A1 | 7/2010 | Higgins |
| 2010/0205563 A1 | 8/2010 | Haapsaari |
| 2010/0313158 A1 | 12/2010 | Lee |
| 2010/0313159 A1 | 12/2010 | Decker |
| 2010/0318200 A1 | 12/2010 | Foslien |
| 2010/0325132 A1 | 12/2010 | Liu |
| 2010/0325134 A1 | 12/2010 | Galfond |
| 2010/0332512 A1 | 12/2010 | Shpits |
| 2010/0333031 A1 | 12/2010 | Castelli |
| 2011/0010667 A1 | 1/2011 | Sakai |
| 2011/0012927 A1 | 1/2011 | Lin |
| 2011/0029925 A1 | 2/2011 | Robert |
| 2011/0035700 A1 | 2/2011 | Meaney |
| 2011/0061082 A1 | 3/2011 | Heo |
| 2011/0078166 A1 | 3/2011 | Oliver |
| 2011/0086675 A1 | 4/2011 | Brinda |
| 2011/0145745 A1 | 6/2011 | Hyeon |
| 2011/0154213 A1 | 6/2011 | Wheatley |
| 2011/0219297 A1 | 9/2011 | Oda |
| 2011/0239149 A1 | 9/2011 | Lazo |
| 2011/0246926 A1 | 10/2011 | Newton |
| 2011/0302556 A1 | 12/2011 | Drukman |
| 2011/0307814 A1 | 12/2011 | Audet |
| 2012/0114296 A1* | 5/2012 | Luo ..................... H04N 9/8205 386/224 |
| 2012/0159320 A1 | 6/2012 | Audet |
| 2012/0159393 A1 | 6/2012 | Sethi |
| 2012/0183273 A1 | 7/2012 | Utsuki |
| 2012/0198385 A1 | 8/2012 | Audet |
| 2012/0198389 A1 | 8/2012 | Audet |
| 2012/0249581 A1 | 10/2012 | Cassistat |
| 2012/0260204 A1 | 10/2012 | Audet |
| 2012/0262398 A1 | 10/2012 | Kim |
| 2013/0080880 A1 | 3/2013 | Cassistat |
| 2013/0080888 A1 | 3/2013 | Audet |
| 2013/0124990 A1* | 5/2013 | Lettau ..................... G11B 27/34 715/716 |
| 2013/0179777 A1 | 7/2013 | Cassistat |
| 2013/0179801 A1 | 7/2013 | Audet |
| 2013/0198190 A1 | 8/2013 | Cassistat |
| 2013/0198782 A1 | 8/2013 | Arruda |
| 2013/0218894 A1 | 8/2013 | Audet |
| 2013/0227470 A1 | 8/2013 | Thorsander |
| 2013/0227487 A1 | 8/2013 | Cassistat |
| 2013/0263050 A1 | 10/2013 | Audet |
| 2013/0290891 A1 | 10/2013 | Audet |
| 2013/0290897 A1 | 10/2013 | Audet |
| 2013/0332453 A1 | 12/2013 | Audet |
| 2013/0332459 A1 | 12/2013 | Audet |
| 2013/0346106 A1 | 12/2013 | Xiao |
| 2014/0181649 A1 | 6/2014 | Audet |
| 2014/0223297 A1 | 8/2014 | Audet |
| 2014/0244625 A1 | 8/2014 | Seghezzi |
| 2014/0245228 A1 | 8/2014 | Audet |
| 2015/0019252 A1 | 1/2015 | Dawson |
| 2015/0324071 A1 | 11/2015 | Audet |
| 2016/0077689 A1 | 3/2016 | Audet |
| 2016/0085390 A1 | 3/2016 | Audet |
| 2016/0092043 A1 | 3/2016 | Missig |
| 2017/0255368 A1 | 9/2017 | Audet |

FOREIGN PATENT DOCUMENTS

| | | |
|---|---|---|
| CA | 2666016 | 7/2014 |
| CA | 2780828 | 10/2015 |
| CA | 2601154 | 9/2016 |
| CA | 2602831 | 9/2016 |
| CA | 2677921 | 6/2017 |
| CA | 2657835 | 9/2017 |
| EP | 2568369 | 3/2013 |
| JP | 07-013971 | 1/1995 |
| JP | 07-085080 | 3/1995 |
| JP | 09-016809 | 6/1995 |
| JP | 08-016612 | 1/1996 |
| JP | 09-265480 | 3/1996 |
| JP | 09-288659 | 11/1997 |
| JP | 10-143414 | 5/1998 |
| JP | 10-149432 | 6/1998 |
| JP | 10-275222 | 10/1998 |
| JP | 11-120180 | 4/1999 |
| JP | 11-195028 | 7/1999 |
| JP | 11-212988 | 8/1999 |
| JP | 2000-099540 | 4/2000 |
| JP | 2000-250942 | 9/2000 |
| JP | 2000-293281 | 10/2000 |
| JP | 2000-348040 | 12/2000 |
| JP | 2001-005822 | 1/2001 |
| JP | WO 2001/22194 | 3/2001 |
| JP | 2001-092737 | 4/2001 |
| JP | 2001-101227 | 4/2001 |
| JP | 2001-167288 | 6/2001 |
| JP | 2001-243244 | 9/2001 |
| JP | 2001-282816 | 10/2001 |
| JP | 2001-331514 | 11/2001 |
| JP | 2001-337762 | 12/2001 |
| JP | 2001-337953 | 12/2001 |
| JP | 2002-056411 | 2/2002 |
| WO | WO-9903271 | 1/1999 |
| WO | WO-2000/65429 | 11/2000 |
| WO | WO-2001/63378 | 8/2001 |
| WO | WO-2001/98881 | 12/2001 |
| WO | WO-02099241 | 12/2002 |
| WO | WO-2003/001345 | 1/2003 |
| WO | WO-2003/032199 | 4/2003 |
| WO | WO-2005/045756 | 5/2005 |
| WO | WO-2005/083595 | 9/2005 |

(56) References Cited

FOREIGN PATENT DOCUMENTS

WO   WO-2007/095997   8/2007
WO   WO-2008/030779   3/2008

OTHER PUBLICATIONS

Haystack Project; David R. Karger, Stephen J. Garland, Karun Bakshi, David Huynh, Nicholas Matsakis, Dennis Quan, Vineet Sinha, Jaime Teevan, Yuan Shen, Punyashloka Biswal, Artem Gleyzer, Ryan Manuel, Alexandre P. Poliakov, Amanda Smith, Lynn A. Stein, Eytan Adar, Mark Asdoorian, Robert Aspell, Wendy Chien, Gabriel Cunningham, Jonathan Derryberry, Adam Holt, Joshua Kramer, Percy Liang, Ilya Lisansky, Aidan Low, Enrique A. Muñoz Torres, Mark Rosen, Kai Shih, Svetlana Shnitser, Ben Walter, Marina Zhurakhinskaya; Massachsetts Institute of Technology; http://web.archive.org/web/20070415053620/http://haystack.lcs.mit.edu/; http://groups.csail.mit.edu/haystack/; http://en.wikipedia.org/wiki/Haystack_%28MIT_project%29 ; Published May 10, 2013.
Chandler Project; Grant Baillie, Jeffrey Harris, Sheila Mooney, Katie Capps Parlante, Jared Rhine, Mimi Yin, Eugene Kim, Alex Russell, Andre Mueninghoff, Al Cho, Aleks Totic, Alec Flett, Andi Vajda, Andy Hertzfeld, Aparna Kadakia, Bobby Rullo, Brendan O'Connor, Brian Douglas Skinner, Brian Kirsch, Brian Moseley, Bryan Stearns, Chao Lam, Chris Haumesser, David Surovell, Donn Denman, Ducky Sherwood, Ed Bindl, Edward Chao, Heikki Toivonen, Jed Burgess, John Anderson, John Townsend, Jürgen Botz, Lisa Dusseault, Lori Motko, Lou Montulli, Mark Jaffe, Matthew Eernisse, Michael Toy, Mike Taylor, Mitch Kapor, Morgen Sagen, Pieter Hartsook, Philippe Bossut, Priscilla Chung, Robin Dunn, Randy Letness, Rys McCusker, Stuart Parmenter, Suzette Tauber, Ted Leung, Travis Vachon, Vinubalaji Gopal ; Open Source Applications Foundation ; http://chandlerproject.org/ ; Published May 10, 2013.
Emacs Org-Mode; Carsten, Bastien Guerry, Eric Shulte, Dan Davison, John Wiegley, Sebastian Rose, Nicolas Goaziou, Achim Gratz, Nick Dokos, Russel Adams, Suvayu Ali, Luis Anaya, Thomas Baumann, Michael Brand, Christophe Bataillon, Alex Bochannek, Jan Böcker, Brad Bozarth, Tom Breton, Charles Cave, Pavel Chalmoviansky, Gregory Chernov, Sacha Chua, Toby S. Cubitt, Baoqiu Cui, Eddward DeVilla, Nick Dokos, Kees Dullemond, Thomas S. Dye, Christian Egli, David Emery, Nic Ferrier, Miguel A. Figueroa-Villanueva, John Foerch, Raimar Finken, Mikael Fornius, Austin Frank, Eric Fraga, Barry Gidden, Niels Giesen, Nicolas Goaziou, Kai Grossjohann, Brian Gough, Bernt Hansen, Manuel Hermenegildo, Phil Jackson, Scott Jaderholm, Matt Jones, Tokuya Kameshima, Jonathan Leech-Pepin, Shidai Liu, Matt Lundin, David Maus, Jason F. McBrayer, Max Mikhanosha, Dmitri Minaev, Stefan Monnier, Richard Moreland, Rick Moynihan, Todd Neal, Greg Newman, Tim O'Callaghan, Osamu Okano, Takeshi Okano, Oliver Oppitz, Scott Otterson, Pete Phillips, Francesco Pizzolante, Martin Pohlack, T.V. Raman, Matthias Rempe, Paul Rivier, Kevin Rogers, Frank Ruell, Jason Riedy, Philip Rooke, Christian Schlauer, Christopher Schmidt, Paul Sexton, Tom Shannon, Ilya Shlyakhter, Stathis Sideris, Daniel Sinder, Dale Smith, James TD Smith, Adam Spiers, Ulf Stegemann, Andy Stewart, David O'Toole, Jambunathan K, Sebastien Vauban, Stefan Vollmar, Jürgen Vollmer, Samuel Wales, Chris Wallace, David Wainberg, Carsten Wimmer, Roland Winkler, Piotr Zielinski; http://orgmode.org/ ; Published May 10, 2013.
TimeLine: Visualizing Integrated Patient Records; Alex A. T. Bui, Denise R. Aberle, Hooshang Kangarloo ; IEE Transactions on information technology in biomedicine, vol. 11, No. 4, Published Jul. 2007.
ChronoTwigger: A visual analytics tool for understanding source and test co-evolution ; Barret Ens, Daniel Rea, Roiy Shpaner, Hadi Hemmati, James E. Young, POurang Irani ; Department of Computer Science, University of Manitoba, Winnipeg, Canada ; Published 2014.
Translation of foreign reference EP2568369.
Visualization of document collection: the vibe system ; in Information Processing & Management vol. 29. Published by Pergamon Press, Molde (Norway), Published Feb. 3, 1992.
Google Maps + Gallery; Sep. 22, 2005; Larry Doliver.
Canadian Intellectual Property Office—Requisition; Apr. 18, 2017; Simon Chau.

\* cited by examiner

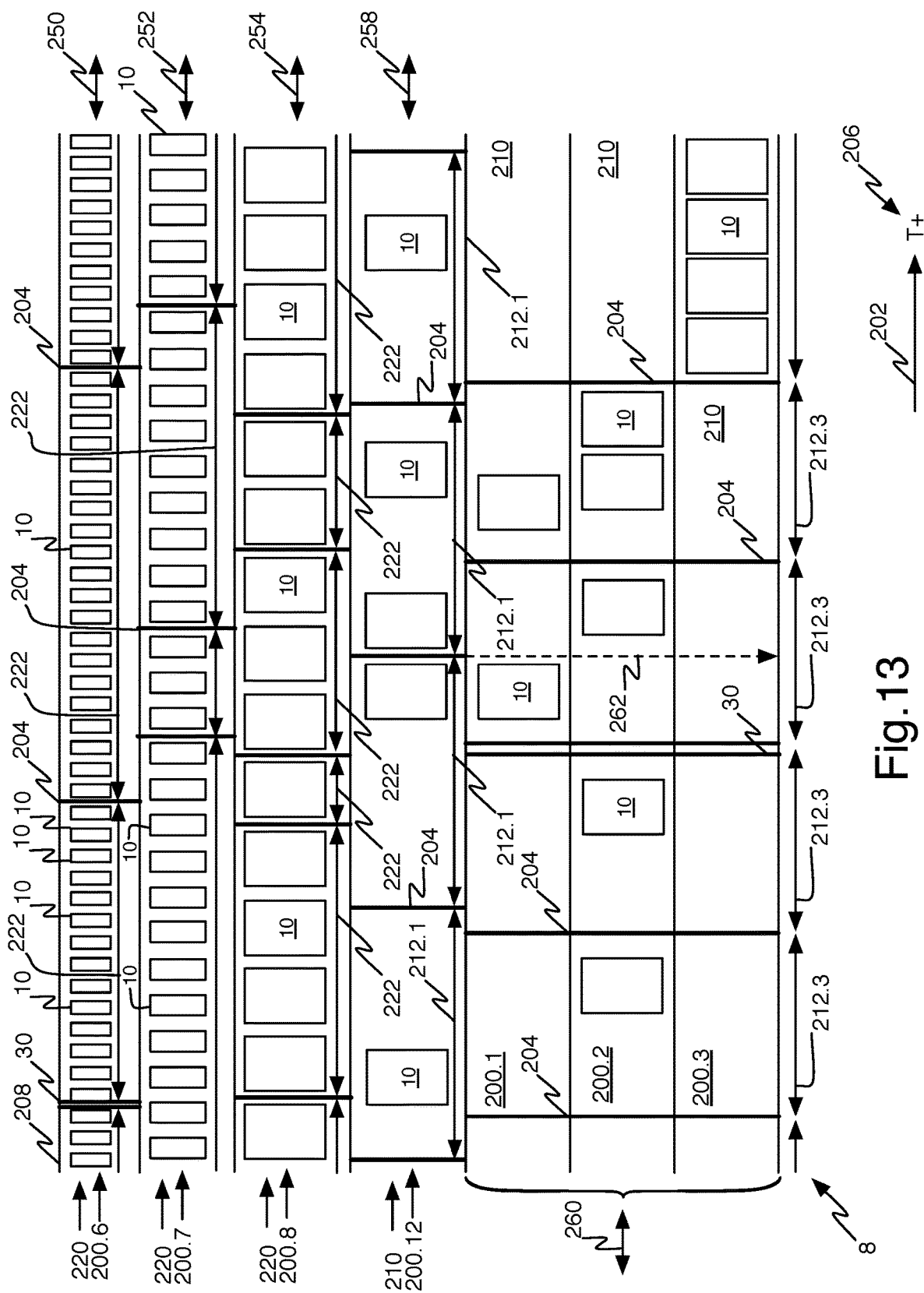

METHOD OF DISPLAYING AXES OF DOCUMENTS WITH TIME-SPACES

CROSS-REFERENCES

The present invention relates to 1) U.S. patent application Ser. No. 11/754,219, filed May 25, 2007, entitled MULTI-DIMENSIONAL LOCATING SYSTEM AND METHOD, now U.S. Pat. No. 8,826,132; 2) U.S. patent application Ser. No. 11/885,120, filed Sep. 13, 2007, entitled INFORMATION ELEMENTS LOCATING SYSTEM AND METHOD, now U.S. Pat. No. 8,069,404; 3) U.S. patent application Ser. No. 11/944,014, filed Nov. 21, 2007, entitled METHOD AND TOOL FOR CLASSIFYING DOCUMENTS TO ALLOW A MULTI-DIMENSIONAL GRAPHICAL REPRESENTATION, now U.S. Pat. No. 8,788,937; and 4) U.S. patent application Ser. No. 11/774,591, filed Jul. 7, 2007, entitled INFORMATION ELEMENTS LOCATING SYSTEM AND METHOD, now U.S. Pat. No. 8,010,508, all of these cited documents being incorporated herein by reference. The present invention also relates to 5) United States Patent Application Publication No. US 2007/0214169 A1, published Sep. 13, 2007, entitled MULTI-DIMENSIONAL LOCATING SYSTEM AND METHOD; and 6) United States Patent Application No. US 2007/0271508 A1, published Nov. 22, 2007, entitled MULTI-DIMENSIONAL LOCATING SYSTEM AND METHOD. Both of these documents are incorporated herein by reference. Additionally, this application is a continuation of and claims priority under 35 U.S.C. § 120 to U.S. patent application Ser. No. 14/930,744, filed Nov. 3, 2015, now U.S. Pat. No. 10,430,495, which '744 Application is a continuation of and claims priority under § 120 to U.S. patent application Ser. No. 13/798,969, filed Mar. 13, 2013, now U.S. Pat. No. 10,430,495, which '969 Application is a continuation of and claims priority under § 120 to U.S. patent application Ser. No. 12/125,908, filed May 22, 2008, now U.S. Pat. No. 8,601,392, which '908 Application claims priority under 35 U.S.C. § 119(e) to each of U.S. Provisional Patent Application No. 60/957,444, filed Aug. 22, 2007; U.S. Provisional Patent Application No. 60/971,214, filed Sep. 10, 2007; and U.S. Provisional Patent Application No. 61/345,625, filed Mar. 7, 2008. All of these cited documents are incorporated herein by reference.

BACKGROUND OF THE INVENTION

1. Field of the Invention

This invention relates generally to computer systems and more specifically to user interfaces for computer systems that facilitates localization and organization of documents along collation functions. More precisely, the present invention relates to a method of combining a plurality of documents sharing a collation function.

2. Description of the Related Art

United States Patent Application Publication No.: US 2007/0214169 A1, published on Sep. 13, 2007 discloses a Multi-dimensional locating system and method (title). The patent application discloses ways for managing and displaying vectors of documents and other computer-readable files. A vector of documents groups a plurality of documents along a predetermined order, inter alia, is taught.

United States Patent Application Publication No.: US 2007/0271508 A1, published on Nov. 22, 2007 discloses a Multi-dimensional locating system and method (title). A plurality of vectors of documents sharing a common timeline is disclosed.

Under some circumstances it is useful to display documents along a timeline although it can prevent an efficient use of the display area when, for example, no documents are located on the timeline over a significant period of time.

More than one vector of documents is displayable wherein each vector of documents can group documents having a specific attribute in common. Thus the number of documents chronologically disposed on each vector of documents can vary and a timescale commonly shared by the vectors of documents does not maximize the use of the display area.

Using the same timescale for a plurality of vectors of documents with a different number of documents on each vector for the same period of time does not allow an efficient simultaneous display of the vectors of documents. If the timescale is based on a vector of documents having many documents, another vector of documents that has very little documents will almost be empty. Conversely, if the timescale is based on the vector of documents having very little documents, the other vector will be so crowded with documents that it will hardly be possible to usefully glance through the documents. The documents being not enough evenly distributed on both vectors of documents it becomes difficult to appreciate documents displayed on different vectors of documents at the same time with the same timescale.

Another issue arises when one vector of documents is more insightfully displaying its documents according to a linear timeline to show, for example, the distribution of the documents on the vector and another vector of documents displays that documents according to a non-linear timeline (i.e. because there is no added value to show the distribution of the documents along the timeline). A common timeline can therefore hardly be used for both arrays of documents.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

It is one aspect of the present invention to provide more than one timeline along which arrays of documents/computer-readable files/multimedia assets are displayed.

Another aspect of the present invention provides an interface adapted to display arrays of documents chronologically displaying documents along timelines using different timescales.

One other aspect of the present invention provides an interface adapted to display documents along a timeline using a linear timescale, where the documents are not evenly displayed along the timeline representing time in a linear fashion, and documents along a timeline using a non-linear timescale, presenting documents with a substantially constant interval therebetween.

One other aspect of the invention provides a combined view where a plurality of arrays of documents displaying documents along a timeline using a linear timescale are displayed with a plurality of arrays of documents displaying documents along a timeline using a non-linear timescale.

Another aspect of the invention provides separate display areas (or time space) respectively displaying arrays of documents about distinct timelines in each display area. The timelines can use a non-linear or a linear timescale.

An aspect of the present invention provides a plurality of arrays of documents displayed along their respective timelines and adapted to move independently along their respective timeline.

One other aspect of the present invention provides a display with multiple time-spaces, each time-space displaying a timeline with its own timescale.

One aspect of the present invention provides a display with multiple time-spaces, each time-space displaying a timeline using either a linear timescale or a non-linear timescale.

Another aspect of the present invention provides a function to change the timescale of an array of documents between a linear timescale and a non-linear timescale.

An aspect of the present invention provides a first time-space on a first display and a second time-space on a second display.

One aspect of the present invention provides time marks that are shared between a plurality of arrays of documents using a compatible timescale.

Another aspect of the present invention provides a non-transitory computer-readable medium having stored thereon computer-executable instructions that, when executed by a processor of a computer system, provide a method of grouping arrays of computer-readable files, the method comprising displaying a first array of computer-readable files, the first array of computer-readable files having a first timeline; displaying a second array of computer-readable files, the second array of computer-readable files having a second timeline; and grouping the first array of computer-readable files with the second array of computer-readable files, the grouped first array of computer-readable files and second array of computer-readable files sharing a same group timeline.

One other aspect of the present invention provides a computerized system configured to read computer-executable instructions adapted to enable a program enabling an interface adapted to group axes of computer-readable files the computerized system comprising a processing unit configured to process the computer executable instructions; and a display configured to display the interface; the program, when executed, being operative to cause the interface to display a first axis of computer-readable files, the first axis of computer-readable files having a first timeline; cause the display to display a second axis of computer-readable files, the second axis of computer-readable files having a second timeline; and cause the first axis of computer-readable files and the second axis of computer-readable files to form a group of axes of computer-readable files, the group of axis of computer-readable files sharing a unified group timeline.

An aspect of the present invention provides a method of combining a plurality of axes of documents adapted to respectively display documents along a substantially rectilinear layout having a respective collation function thereof, the method comprising displaying a first axis of documents along a first collation function; displaying a second axis of documents along a second collation function; selecting the first axis of documents; dragging the first axis of documents to the second axis of documents; and combining the first axis of documents with the first axis of documents by sharing a common collation function hereby displaying the documents of the first axis of documents and the documents of the second axis of documents in a combined fashion to illustrate their respective distribution of documents along the common collation function.

These and other advantages and features of the present invention will become apparent from the following description and the attached drawings.

BRIEF DESCRIPTION OF THE DRAWINGS

FIG. 13 is a schematic view of a plurality of arrays of documents along either a non-linear timeline or a linear timeline.

DESCRIPTION OF EMBODIMENT(S) OF THE INVENTION

Figure 1:
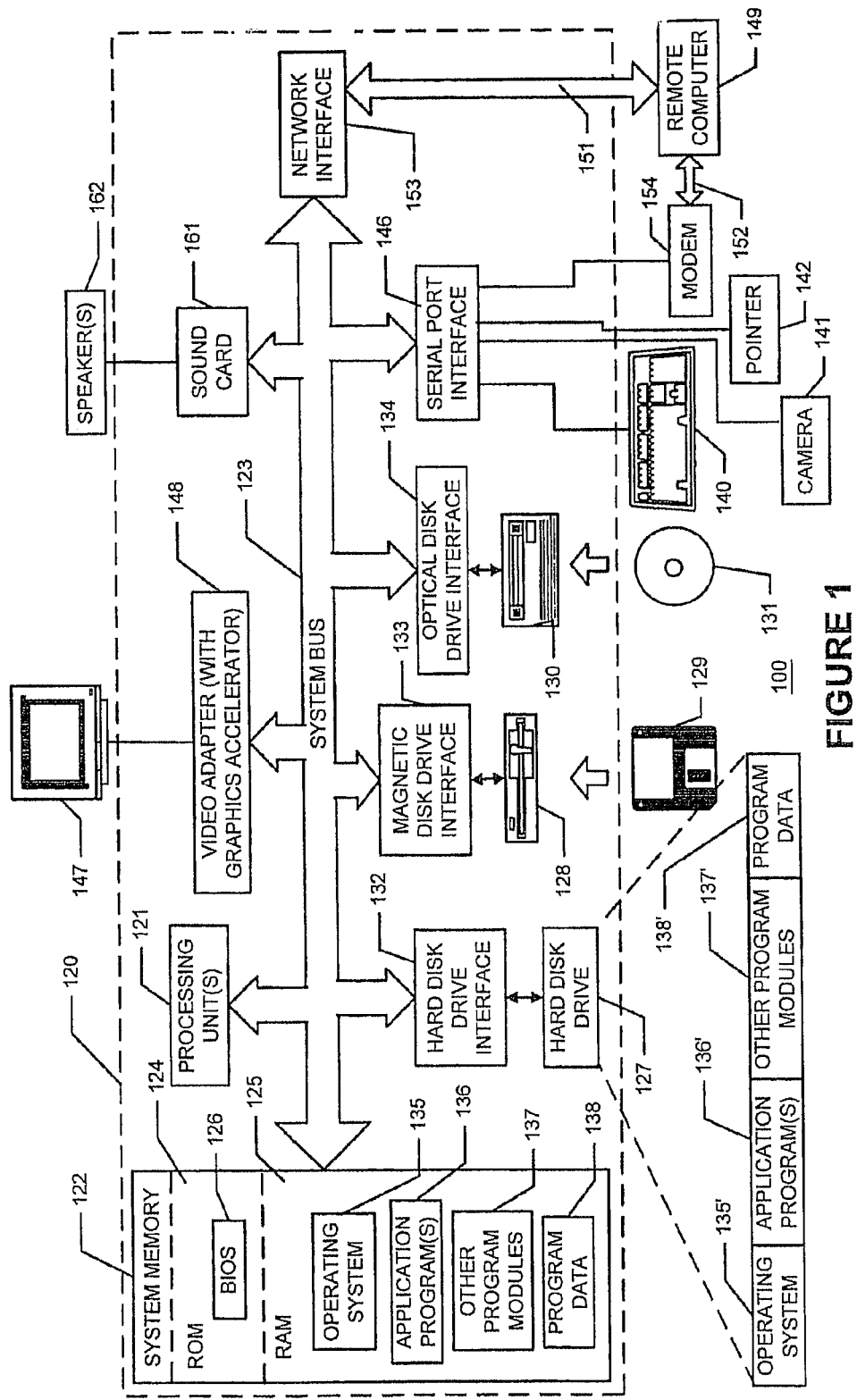
FIG. 1 is a schematic view of a computer system.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The features provided in this specification mainly relates to computer software and machine-readable code/instructions. This code/instructions are preferably stored on a machine-readable medium to be read and acted upon to with a computer or a machine having the appropriate code/instructions reading capability.

FIG. 1 and the following discussion provide a brief, general description of an exemplary apparatus in which at least some aspects of the present invention may be implemented. The present invention will be described in the general context of computer-executable instructions, such as program modules, being executed by a personal computer. However, the methods of the present invention may be affected by other apparatus. Program modules may include routines, programs, objects, components, data structures, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, portable phones and the like. At least some aspects of the present invention may also be practiced in distributed computing environments where tasks are performed by remote processing devices linked through a communications network (i.e. client-server, internet based application). In a distributed computing environment, program modules may be located in local and/or remote memory storage devices.

With reference to FIG. 1, an exemplary apparatus 100 for implementing at least some aspects of the present invention includes a general purpose computing device in the form of a conventional personal computer 120. The personal computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer information between elements within the personal computer 120, such as during start-up, may be stored in ROM 124. The personal computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide nonvolatile (or persistent) storage of machine readable instructions, data structures, program modules and other data for the personal computer 120. Although the exemplary environment described herein employs a hard disk, a removable magnetic disk 129 and a removable optical disk 131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 127, magnetic disk 129, (magneto) optical disk 131, ROM 124 or RAM 125, such as an operating system 135 (for example, Windows® NT® 4.0, sold by Microsoft® Corporation of Redmond, Wash.), one or more application programs 136, other program modules 137 (such as "Alice", which is a research system developed by the User Interface Group at Carnegie Mellon University available at www.Alice.org, OpenGL from Silicon Graphics Inc. of Mountain View Calif., or Direct 3D from Microsoft Corp. of Bellevue Wash.), and/or program data 138 for example.

A user may enter commands and information into the personal computer 120 through input devices, such as a keyboard 140, a camera 141 and pointing device 142 for example. Other input devices (not shown) such as a microphone, joystick, game pad, satellite dish, scanner, a touch sensitive screen, or the like may also be included. These and other input devices are often connected to the processing unit 121 through a serial port interface 146 coupled to the system bus. However, input devices may be connected by other interfaces, such as a parallel port, a game port or a universal serial bus (USB). For example, since the bandwidth of the camera 141 may be too great for the serial port, the video camera 141 may be coupled with the system bus 123 via a video capture card (not shown). The video monitor 147 or other type of display device may also be connected to the system bus 123 via an interface, such as a video adapter 148 for example. The video adapter 148 may include a graphics accelerator. One or more speaker 162 may be connected to the system bus 123 via a sound card 161 (e.g., a wave table synthesizer such as product number AWE64 Gold Card from Creative® Labs of Milpitas, Calif.). In addition to the monitor 147 and speaker(s) 162, the personal computer 120 may include other peripheral output devices (not shown), such as a printer for example. As an alternative or an addition to the video monitor 147, a stereo video output device, such as a head mounted display or LCD shutter glasses for example, could be used.

The personal computer 120 may operate in a networked environment which defines logical connections to one or more remote computers, such as a remote computer 149. The remote computer 149 may be another personal computer, a server, a router, a network PC, a peer device or other common network node, and may include many or all of the elements described above relative to the personal computer 120, although only a memory storage device has been illustrated in FIG. 1. The logical connections depicted in FIG. 1 include a local area network (LAN) 151 and a wide area network (WAN) 152, an intranet and the Internet.

When used in a LAN, the personal computer 120 may be connected to the LAN 151 through a network interface adapter (or "NIC") 153. When used in a WAN, such as the Internet, the personal computer 120 may include a modem 154 or other means for establishing communications over the wide area network 152 (e.g. Wi-Fi, WinMax). The modem 154, which may be internal or external, may be connected to the system bus 123 via the serial port interface 146. In a networked environment, at least some of the program modules depicted relative to the personal computer 120 may be stored in the remote memory storage device. The network connections shown are exemplary and other means of establishing a communications link between the computers may be used.

Figure 2:
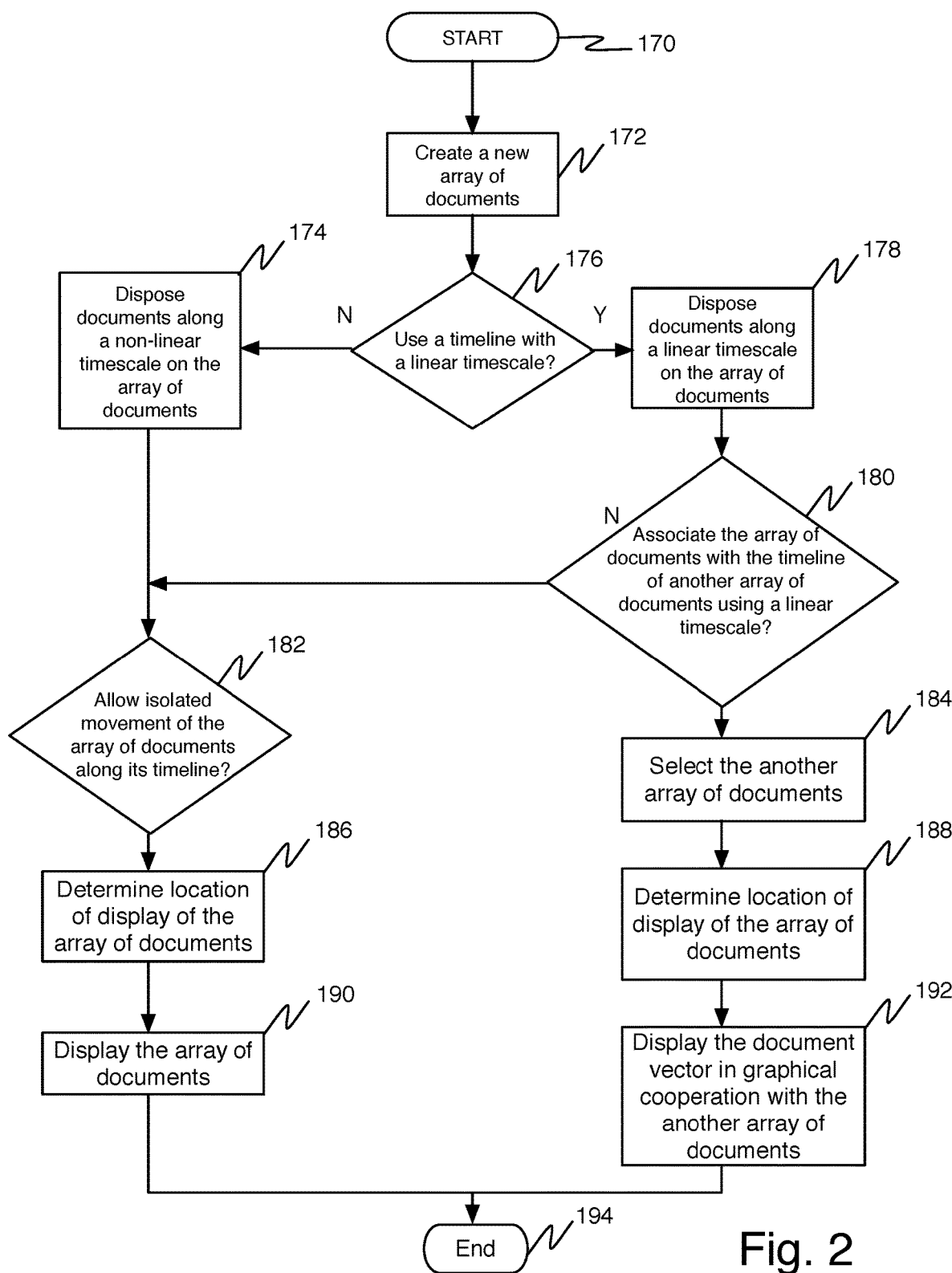
FIG. 2 is a flow chart of one exemplary process that can be used to create a new array of documents.

FIG. 2 is a flow chart of one exemplary way to create an array of documents (or an array of computer-readable files or an array of multimedia assets). A user of the computer interface desires to create a new array of documents 172. The user decides what timescale will use the timeline of the new array of documents 176. If a linear timescale is selected the documents will be disposed on the new array of documents along a timeline using a linear timescale 178. Conversely, if a non-linear timescale is selected the documents will be disposed on the new array of documents along a timeline using a non-linear timescale 174. Continuing with the new array of documents using a non-linear timescale 174 the user can decide whether isolated movement of the new array of documents along its timeline will be allowed 182. The location of the new array of documents on the display is then selected 186 and the new array of documents is displayed on the display 190.

Returning back to the new array of documents using the linear timescale 178. Once the type of timescale is decided the user decides if s/he wants to associate the linear timescale of the new array of documents with an already existing array of documents using a linear timescale 180. If no association with another array of documents is made, then the process follows the route explained above at box 182. In contrast, if the linear timescale of the new array of documents is associated with another array of documents, the another array of documents is then selected among other arrays of documents 184. The array of documents to be selected can already be associated with a number of other arrays of documents thus all sharing the same linear timescale. Once the other array of documents is selected then the location of the display of the new array of document is decided 188. It can be made by a simple selection on the display but preferably next to the array of documents with which the timescale is shared so that the time marks can be commonly shared. The new array of documents is then displayed 192. This ends 194 one exemplary way to create a new array of documents taking into consideration the type of timescale to be used in addition to several other related decisions.

Now that a general process has been explained we will move to a more detailed explanation of its constituting parts.

In the context of the present invention the following terms are generally used with their associated meaning.

Document: A piece of information. Generally, a computer file usually created with an application (such as a word processor) carrying textual, audio, video or graphical information.

Timeline: A chronological order adapted to position documents according to a time-related parameter.

Timescale: The time distribution along the timeline.

Linear timescale: Substantially constant time distribution.

Non-linear timescale: Substantially variable time distribution.

Array: A regular and imposing grouping or arrangement of documents/files/assets. Generally, an array of documents will dispose documents along a substantially rectilinear fashion although other dispositions (such as inter alia multiple rectilinear superposition, matrixes, flow charts like disposition, tri-dimensional distribution) are encompassed by the present definition.

Combined view: Display of arrays of documents having different timescales.

Display: Means for displaying a graphical representation of an array of documents. Commonly referred to, inter alia, a computer screen, a television, a projector, a touch sensitive screen and a means to provide tri-dimensional graphical rendering.

Time-space: Means for displaying arrays of documents using a similar timescale. The time-space can accommodate a single array of document.

Figure 3:
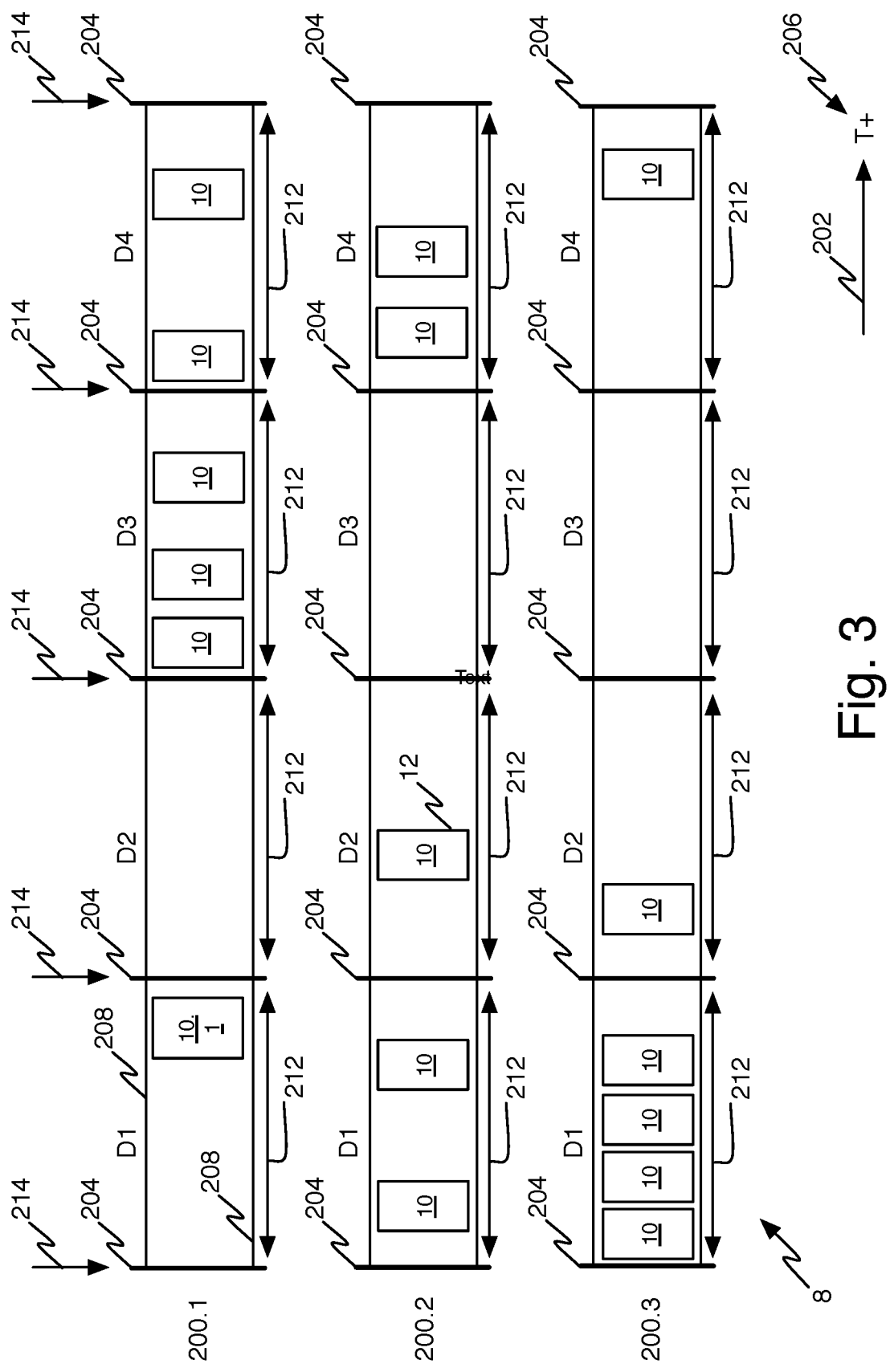
FIG. 3 is a schematic view of an illustrative display portion of a graphical user interface displaying a plurality of arrays of documents along a linear timeline.

FIG. 3 illustrates three arrays of documents 200.1, 200.2, 200.3 disposed next to one another on a computer interface 8. Each array of documents 200.1, 200.2, 200.3 has a vector-like shape and is bordered with guides 208 to visually emphasis the width and the direction of each array of documents 200.1, 200.2, 200.3. Each array of documents 200.1, 200.2, 200.3 displays a series of documents 10 disposed along a timeline 202. Each array of documents 200.1, 200.2, 200.3 can group and display a plurality of documents 10 having a commonality. A commonality like an attribute associated with each document or a tag in common so that only a subset of a larger group of documents 10 is displayed. In the present situation the timeline is a chronological timeline where positive time 206 is heading to the right of FIG. 3. Each document 10 is disposed along the timeline 202 on its array of documents 200.1, 200.2, 200.3 in accordance with a time-related criteria that can be, inter alia, the time of insertion of the document 10 in the computer system running the interface, the time at which a document was modified last, the time of creation of the document, the last viewed time, the end of a delay, a bar date, the date by which a document should be received in reaction to an action made earlier in time or simply an arbitrary time associated with each document. The user can decide, for instance, that all documents 10 will be displayed along their related timelines using the time of insertion of the documents in the computer system. This way all documents will be disposed on a timeline at the exact time they were inserted in the computer system. For simplification each document can appear during the day of its insertion in the system and not precisely at the exact hour.

Still on FIG. 3, each array of documents 200.1, 200.2, 200.3 is separated in unit of time. In this case the units of time are days D1, D2, D3, D4. Each unit of time D1, D2, D3, D4 is separated with a time mark 204. For example, day 1 (D1), day 2 (D2), day 3 (D3), day 4 (D4) and day 5 (D5) all have the same length 212 and are each respectively separated by a time mark 204. In this case, the illustrative example is using a "day" as time unit but it could be minutes, hours, weeks, months, years, fiscal year, a project milestones or any other custom duration of time. Each unit of time D1, D2, D3, D4 on FIG. 3 is represented with a constant time length 212. The first document 10.1 on the array of documents 200.1 was, for example, inserted in the computer system on the second half of the day represented by unit of time D1. No document was inserted on D2 and so on so forth.

The timescale of all arrays of documents depicted on FIG. 3 is a linear timescale. This means that the duration of each unit of time D1, D2, D3, D4 is represented having the same length 212. The constant time length 212 provides the possibility of aligning 214 each time mark 204 to unify the timescale of all arrays of documents 200.1, 200.2, 200.3, 200.4.

Still referring to FIG. 3, the distance between each array of documents 200.1, 200.2, 200.3 can be the same of it can vary depending on what is desired by the user of the computer interface 8. Each document 10 is represented with a rectangle 12 but other shapes are encompassed by the present invention. The rectangular shape 12 is used because it infers more easily with a sheet of paper in the present illustrative example. Each document 10 is either displaying the document itself, a thumbnail of the document or an icon depending on the purpose of the view, the level of the zoom and/or the desired amount of details to be shown. A picture taken in landscape would have a different shape and the present invention does not intend to be limited to the illustrative shapes displayed in the Figures.

In the following Figures all documents 10, time marks 204 and time length 212 might not be individually associated with a related reference number to avoid uselessly overloading the Figures. The Applicant assumes that people skilled in the art of computer interface will not be confused with the omitted reference numbers on the Figures when considered in light of the description and will be resourceful enough to refer to a Figure where the reference number is indicated or relevant passage from the description in case of need.

Turning back now to FIG. 4 illustrating the same three arrays of documents 200.1, 200.2, 200.3 from FIG. 3. Two additional arrays of documents 200.4, 200.5 have been added non-parallel to the three first arrays of documents 200.1, 200.2, 200.3. Array 200.4 is logically intersecting array 200.2, based on intersecting document 20. Array 200.4 also shows time marks 204 and constant time lengths 212. Similarly, intersecting array 200.5 is logically intersecting array 200.1, based on intersecting document 20. Array 200.5 also shows time marks 204 and variable time lengths 222 that will be discussed below. The role of intersecting arrays 200.4, 200.5 is explained in details in a previous patent application referenced by the instant patent application and will not be discussed here in details.

Figure 4:
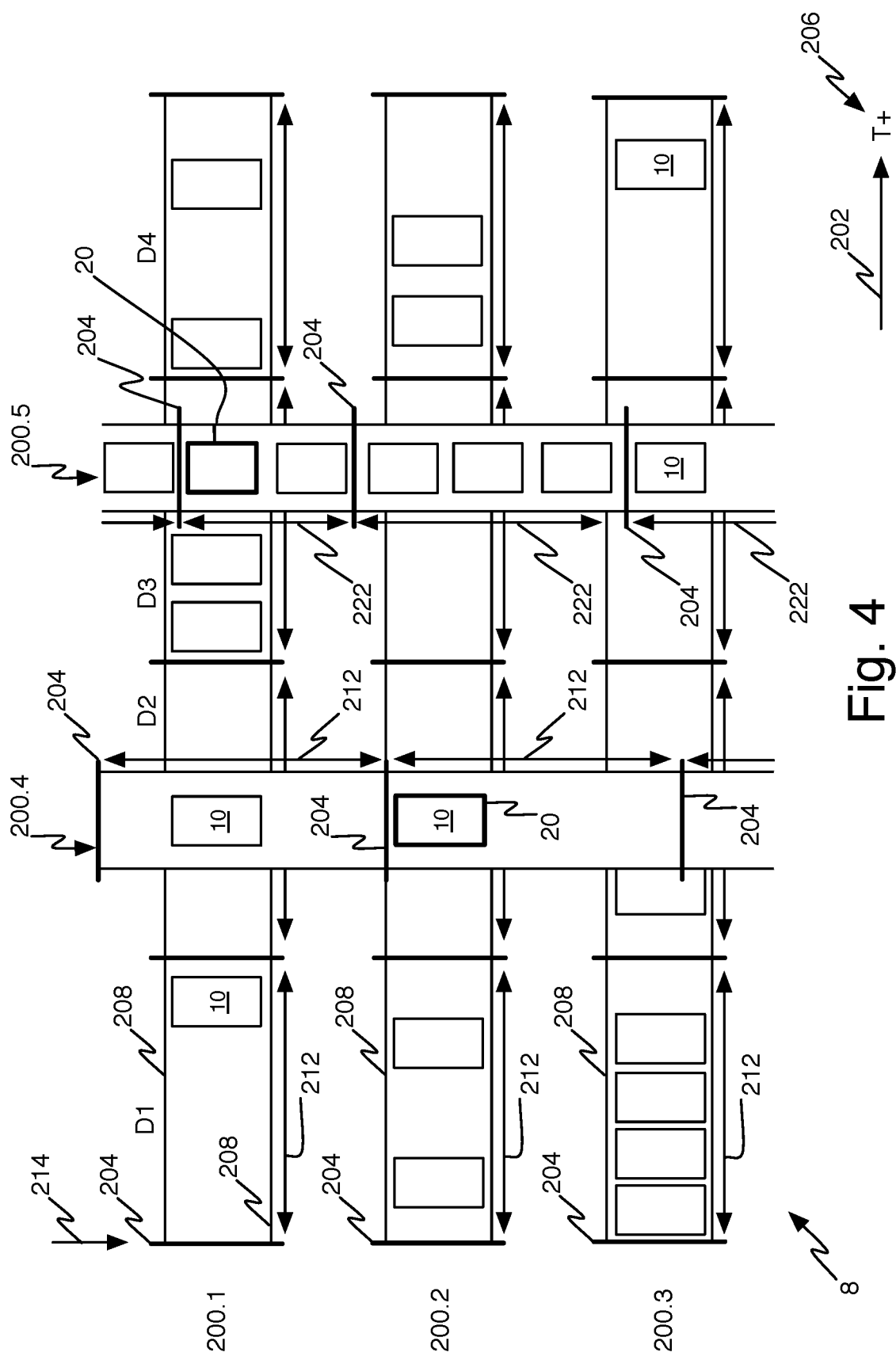
FIG. 4 is the schematic view of FIG. 3 with additional intersecting arrays of documents.

The array of documents 200.1 illustrated on FIG. 3 and FIG. 4 has a unit of time D2 containing no documents. Depending on the situation it might be helpful to see the distribution of the documents 10 depicted along the timeline 202 of array 200.1 with the empty units of time. However, it is also a loss of space on the display if the distribution of the documents 10 on the array and the showing of a unit of time D2 showing no documents 10 are not insightful. Removal of specific units of time or empty units of time can be desirable. For example, a unit of time D4 might not contain documents 10 that are desirable to see and this unit of time D4 might be removed from the display. The removal of units of time can be made manually by a user or automatically if, for instance, there is no documents in a time unit or if only documents having a specified attribute are present.

Figure 5:
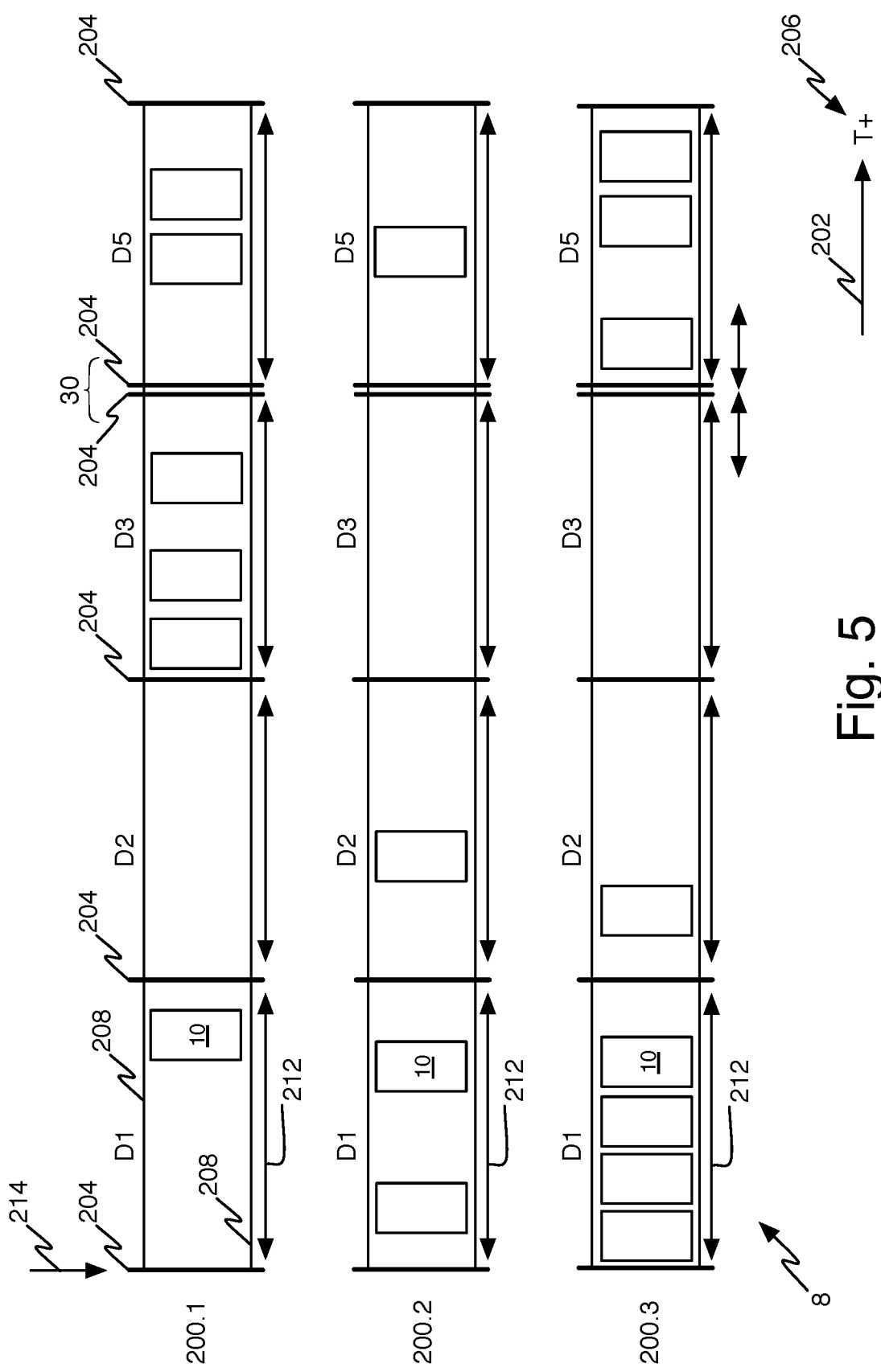
FIG. 5 is the schematic view of FIG. 3 with invisible units of time.

An alternate view of FIG. 3 hiding unit of time D4 is illustrated on FIG. 5. The unit of time D4 is hidden and the time marks 204 juxtaposed to the unit of time D4 have been moved close one to each other to form a distinctive visual time mark 30 that is called invisible unit of time time mark 30. The selection of invisible unit of time mark 30 by the user of the interface can provide information about the invisible time period and the possibility of display it if desired. A selection of one or many unit(s) of time D can offer the possibility to render invisible this portion of the timeline.

Figure 6:
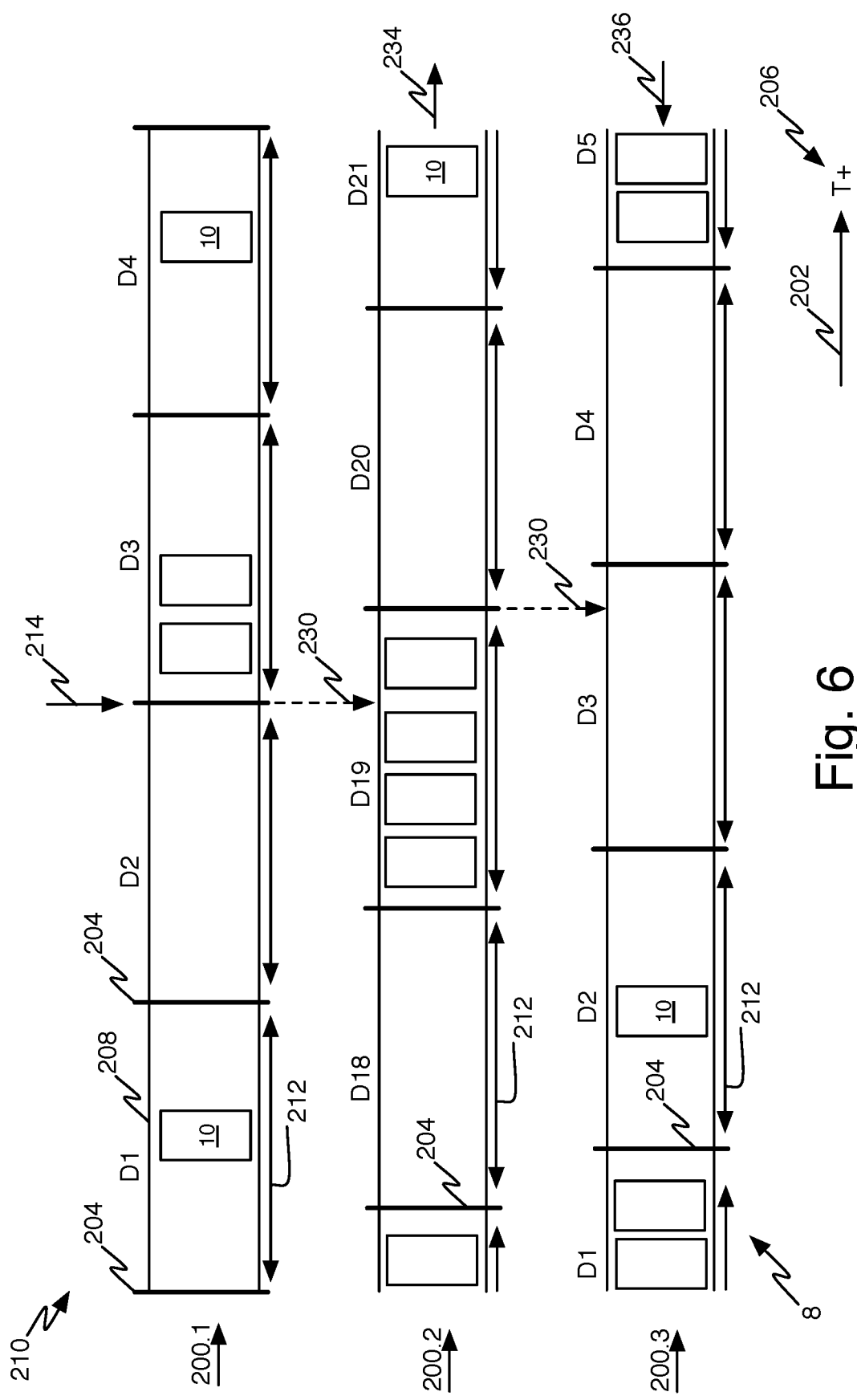
FIG. 6 is the schematic view of FIG. 3 with non-aligned time marks.

FIG. 6 illustrates the three arrays of documents 200.1, 200.2, 200.3 of FIG. 3 with the difference that the time marks 204 are not aligned anymore as indicated by dotted arrow 230. Despite the three arrays of documents 200.1, 200.2, 200.3 sharing a similar linear timescale they cannot share the same timemarks 204.

Array of document 200.2 has been individually translated in the positive 206 direction of the timeline 202 as indicated by arrow 234 while the first array of documents 200.1 remained in the same position. The third array of documents 200.3 has slightly been individually translated in the negative direction of the timeline 202 as indicated by arrow 236.

The translation along the timeline of an array of documents 200.2, 200.3 allows a user to visualize a different unit of time on the array of documents. For example, array of documents 200.1 displays units of time D1, D2, D3, D4 while units of time D18, D19, D20, D21 are displayed for the second array of documents 200.2. The third array of documents 200.3 is still displaying the same units of time D1, D2, D3, D4 as the first array of documents 200.1 although a slight translation has begun and unit of time D5 is now partially visible anymore.

The translation of an array of document can be made with an appropriate control in communication with the computer system to manage the arrays of documents on the interface. For instance, the arrow keys on the keyboard, a mouse, a pointing device, fingers on a tactile screen, a gamepad or any other means to influence the position of the arrays on the display is encompassed by the present invention. In the present example a point-click-hold-and-move set of actions with a pointing device has positioned the arrays of documents.

Figure 7:
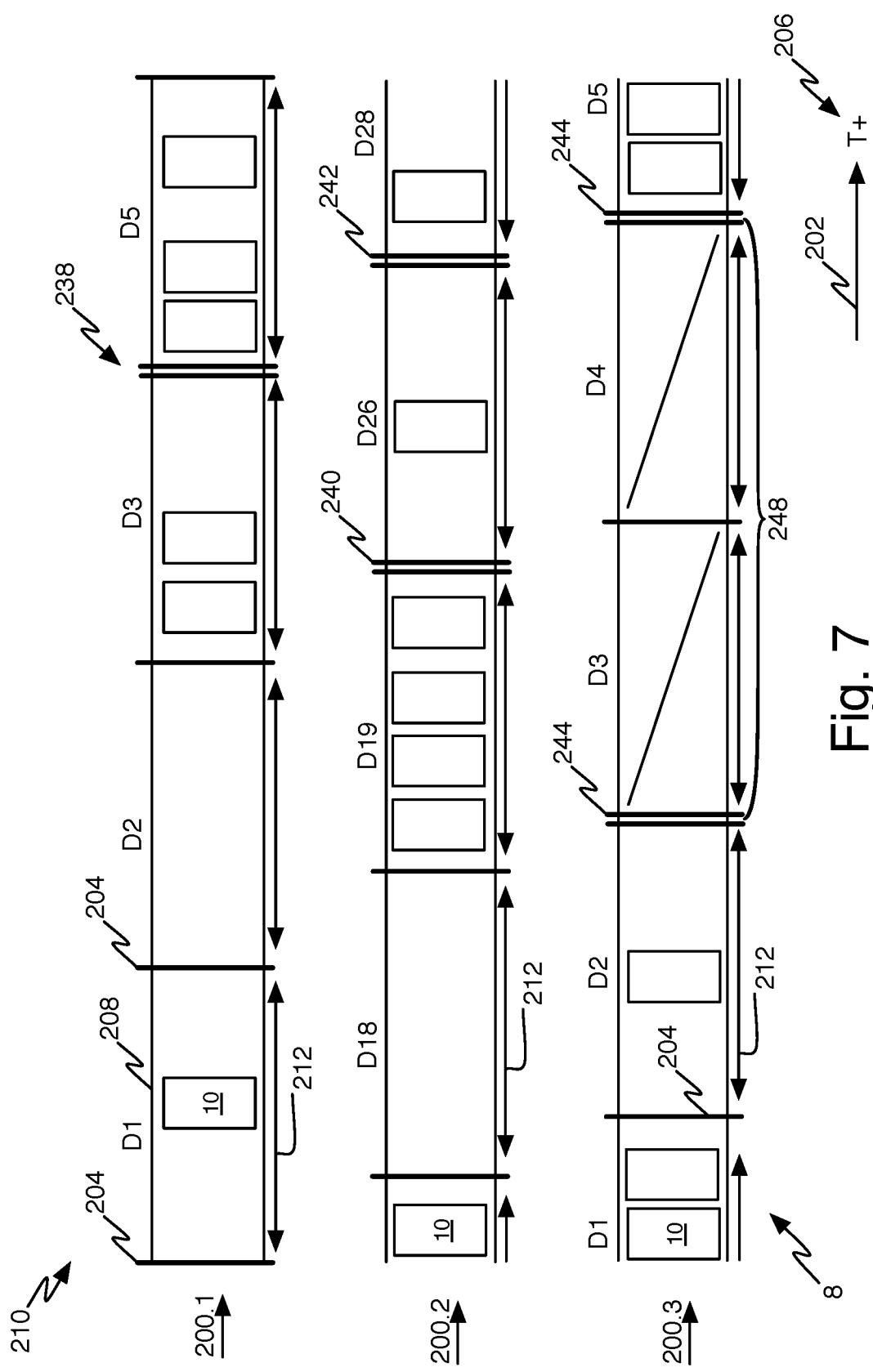
FIG. 7 is the schematic view of FIG. 3 with non-aligned time marks and invisible units of time.

Referring to FIG. 7 one can appreciate that, as indicated by arrow 238, unit of time D4 from array of documents 200.1 has been hidden in favor of adjacent units of time D3, D5 containing documents. Several units of time (e.g. D20 to D25 and D27) have been hidden from array of documents 200.2 as indicated by invisible unit of time timemarks 240, 242. On array of documents 200.3, units of time D3, D4 are in the process of being hidden to benefit units of time D2, D5. Invisible unit of time timemarks 244, 246 are already displayed on array of documents 200.3 and a length 248 will not be visible anymore until the interface is instructed to render this length 248 visible again. Units of time including documents can be hidden if required by the user based on some criterions like a selected attribute.

Figure 8:
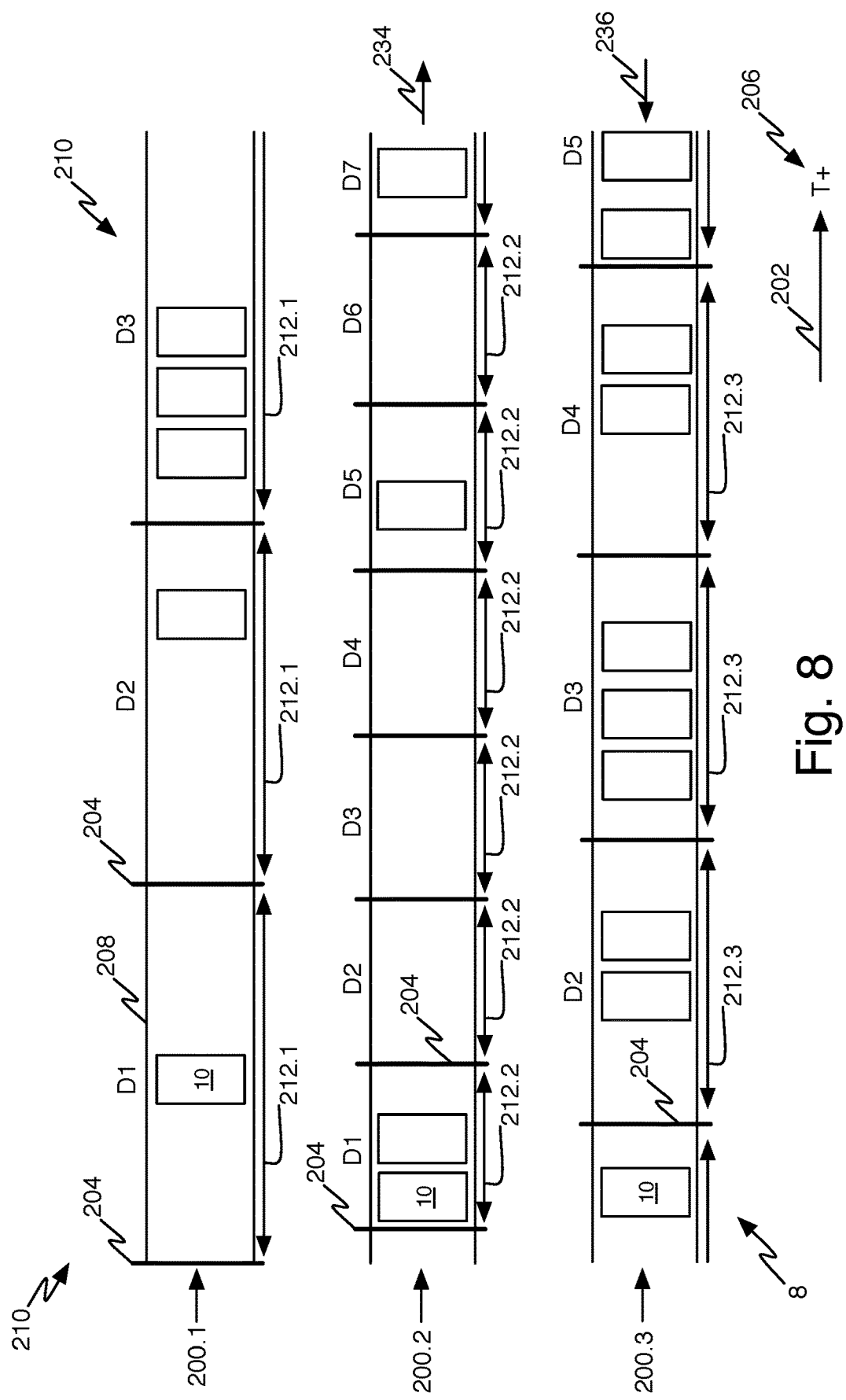
FIG. 8 is a schematic view of an illustrative graphical user interface displaying a plurality of arrays of documents along distinct timelines.

FIG. 8 illustrates three arrays of documents 200.1, 200.2, 200.3 having a linear timescale. The linear timescale of each array of documents is however different as opposed to the previous illustrative example depicted on FIG. 7. On FIG. 8, the first array 200.1 uses unit of time 212.1 having a duration of time that is longer than the duration of the unit of time 212.2 of array 200.3. The duration of the unit of time 212.3 of array 200.3 is longer than the duration of time of unit of time 212.2 but shorter than the duration of unit of time 212.1. A different number of unit of time 212 can be shown on the same display width.

Since arrays 200.1, 200.2, 200.3 are not using the same duration of unit of time they cannot share the same time marks 204. The duration of the unit of time of each array of documents can be selected individually to provide the view that is the most suited for the user. If for instance array 200.1 is displaying documents 10 that are more important than the documents displayed by array 200.2, then, the duration of the unit of time 212.1 can be set to be longer than the duration of the unit of time 212.2. Because the durations of time of each array of documents is distinct the time marks cannot be used collectively.

Figure 9:
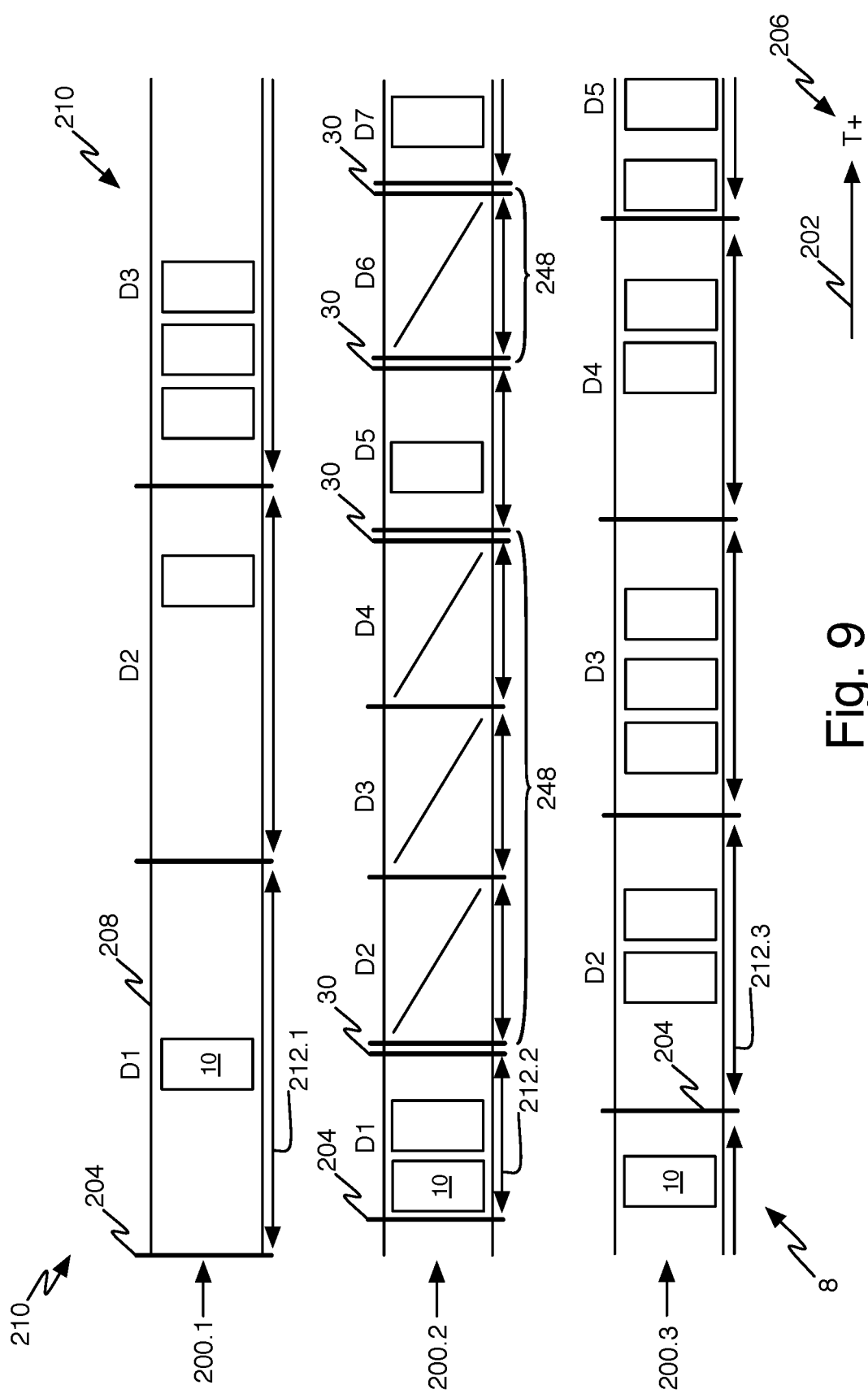
FIG. 9 is the schematic view of FIG. 8 with units of time about to become invisible.

Referring now to FIG. 9 one can appreciate the same arrays of documents as the ones displayed on FIG. 8 although lengths of time 248 from array 200.2 are about to be rendered invisible. The principle has been explained before and it will not be re-explained here. The same mechanism is simply applied in this embodiment.

Figure 10:
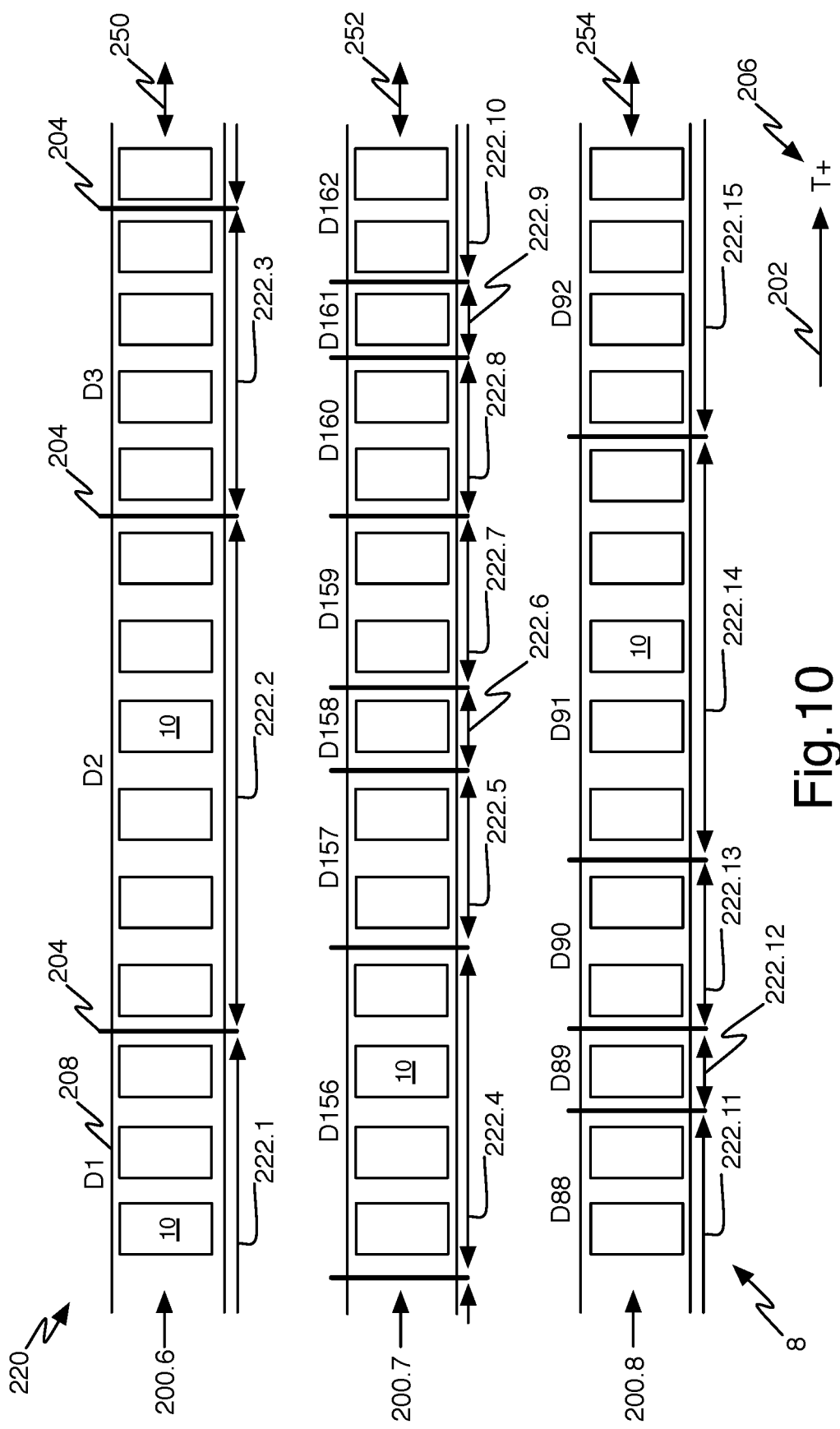
FIG. 10 is a schematic view of an illustrative graphical user interface displaying a plurality of arrays of documents along a non-linear timeline.

Turning now to FIG. 10 displaying three new arrays of documents 200.6, 200.7, 200.8. Each of these arrays of documents 200.6, 200.7, 200.8 are displaying documents 10 along their respective timelines 202 using a non-linear timescale. The non-linear time line is giving up the linearity of time in favor of an even documents distribution using more efficiently the space available on the array of documents. The use of a non-linear timescale disposes each document 10 at a substantially constant interval. For instance, array of documents 200.6 display a portion of its first time unit D1 having a length 222.1 corresponding to the length needed to display all documents 10 that need to be displayed in time unit D1. The second time unit D2 on array of documents 200.6 displays six documents 10 along the timeline 202 and the length 222.2 is the length needed to evenly distribute and display the six documents 10. The same for the third time unit D3 with its four documents. Each time unit D1, D2, D3 is separated with a time mark 204 from the other adjacent time unit.

Still on FIG. 10, array of documents 200.7 displays time units D156, D157, D158, D159, D160, D161, D162. Each time unit D156-D162 contains a number of documents 10 and the length of each time unit 222.4, 222.5, 222.6, 222.7, 222.8, 222.9, 222.10 is proportional to the length needed to equally distribute the number of documents belonging to each unit of time. The same logic applies to array of documents 200.8 with units of time D88-D92 and timeline lengths 222.11-222.15.

Each array of documents 200.6, 200.7, 200.8 can be displaced along the timeline 202 like it is respectively indicated by arrows 250, 252, 254. This explains why different time periods are visible on each array despite they appear one over the other. The time marks 204 are not aligned across the three arrays of documents because the length of each time unit D* is not standardized (e.g. non-linear timescale) in contrast to the standardized length of units of time used by a linear timescale as previously described.

The non-linear timescale 220 does save space on the display because there are no empty spaces left out as opposed to the use of a linear timescale 210 always using the same length for each unit of time.

Figure 11:
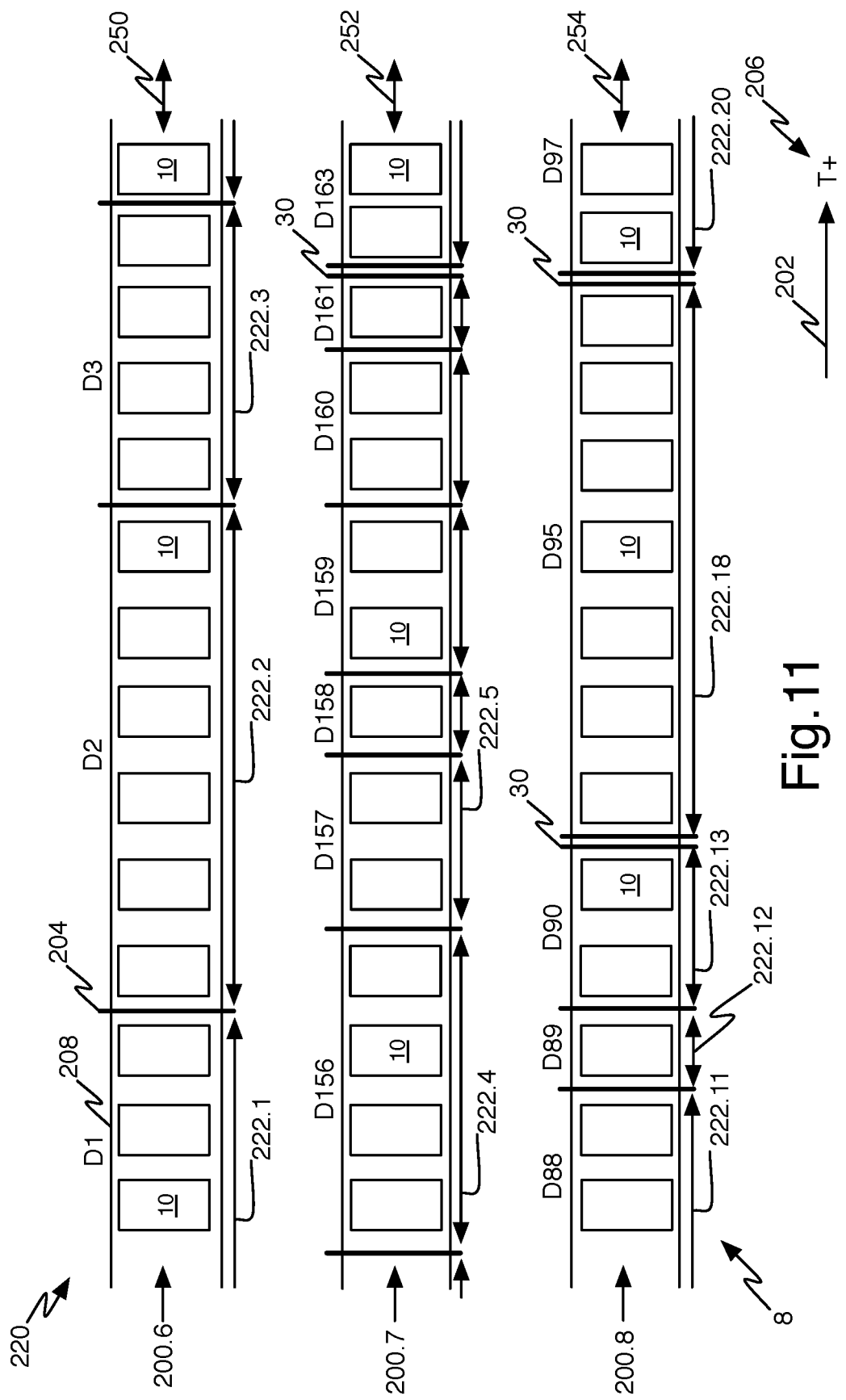
FIG. 11 is the schematic view of FIG. 10 with some invisible units of time.

Referring now to FIG. 11 one can appreciate the removal of particular time units. Time units D162 is now invisible and invisible unit of time time mark 30 identifies the location of the invisible time units. Array of documents 200.8 has two invisible unit of time time marks 30 because units of time D91-D94 and D96 are invisible. The same principle of invisibility is applied here on arrays of documents 200.6, 200.7, 2008 using a non-linear timescale 220.

Figure 12:
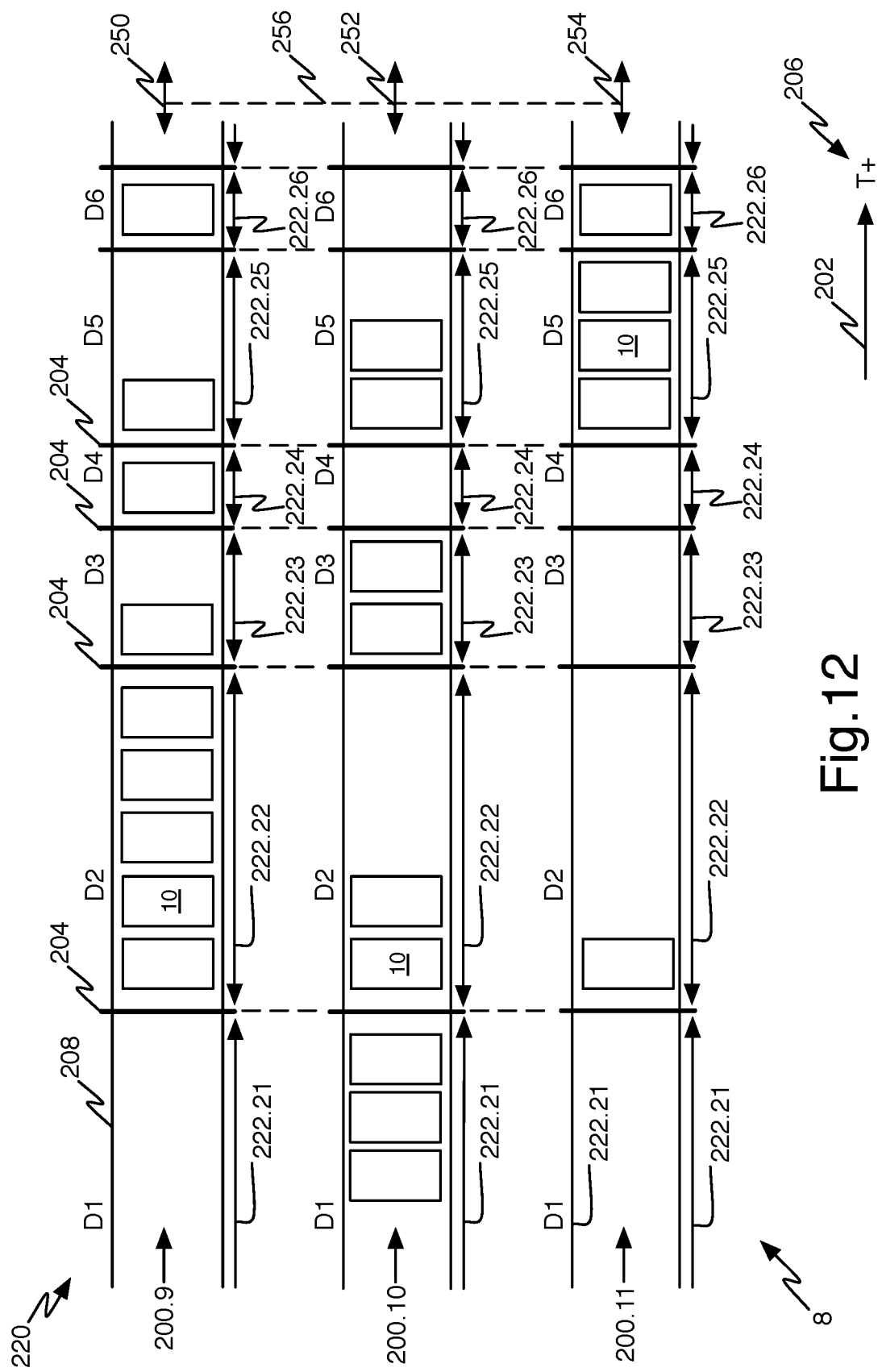
FIG. 12 is a schematic view of an illustrative graphical user interface displaying a plurality of arrays of documents along a non-linear timeline.

FIG. 12 illustrates another embodiment where the three arrays of documents 200.9, 200.10, 200.11 are using a shared non-linear timescale to display the documents along their timelines 202. On FIG. 12 however, despite a non-linear timescale is used, the time marks 204 are aligned across all arrays of documents 200.9, 200.10, 200.11. This is possible by grouping the three arrays of documents 200.9, 200.10, 200.11 and defining the length of each unit of time D* by using the longer length 222 needed across all the arrays of documents 200.9, 200.10, 200.11. In the illustrative example depicted by FIG. 12 unit of time D2 uses the length 222.22 based on the length needed to fit the five documents 10 on array 200.9. Unit of time D3 uses the length 222.23 based on the length needed to fit the two documents 10 on array 200.10, unit of time D4 uses the length 222.24 based on the length needed to fit a single document 10 on array 200.9 and unit of time D5 uses the length 222.25 based on the length needed to fit the three documents 10 on array 200.11. Unit of time D6 have the length of a single document 10 to accommodate one document located in two arrays 200.9, 200.11.

This type of presentation allows grouping and aligning the time marks 204 of a plurality of arrays of documents using a non-linear timescale 220. The save in display space is not as good as the previous embodiment however it might be more easy to see the same time period 222 on several arrays of documents 200 at once. The movement 250, 252, 254 along the timeline 202 of the arrays of documents 200.9, 200.10, 200.11 are preferably connected 256 so that all arrays are moving together to keep the time marks 204.

FIG. 13 illustrates a view of the interface presenting a plurality of arrays of documents 200.6, 200.7, 200.8, 200.12, 200.1, 200.2, 200.3. Arrays of documents 200.6, 200.7, 200.8 are using a non-linear timescale to display the documents along their time line 202. Conversely, arrays of documents 200.12, 200.1, 200.2, 200.3 are using a linear timescale to display the documents along their timeline 202.

Documents on the arrays of documents 200.6, 200.7 are smaller than the documents on arrays of documents 200.12, for instance, because it was desired to show more documents 10 on these arrays of documents despite the documents 10 are smaller. Arrays of documents 200.6 also illustrates a cut in the timeline 202 illustrated by the invisible unit of time time mark 30 where a unit of time 222 is invisible.

The time marks 204 on arrays of documents 200.6, 200.7, 200.8 are not aligned because, as explained earlier, they are not sharing the same linear timescale thus they have different unit of time 222 lengths.

Turning now to arrays of documents 200.12, 200.1, 200.2, 200.3 using a linear timescale. The units of time length 212.1 of the array 200.12 are longer than the unit of time length 212.3 used by the arrays 200.1, 200.2, 200.3 therefore less units of time will be displayed on the same display for array 200.12 and the time marks 204 cannot be aligned 262 or shared. However, arrays of documents 200.1, 200.2, 200.3 are using a common linear timescale 210 and can therefore share time marks 204 between them. The arrays can also be moved 250, 252, 254, 258, 260, individually, in groups or collectively 260, along the timeline 202. Arrays of documents 200.1, 200.2, 200.3 also illustrate a cut in the timeline 202 illustrated by the invisible unit of time time mark 30 where one or many units of time 212.3 are invisible in accordance with the desire of a hypothetical user.

All the arrays of documents illustrated on FIG. 13 can be reordered (i.e. vertically) to meet one's preferences. Spaces can be left between two arrays although they are all presented sharing no space therebetween on the illustrative FIG. 13.

All the arrays of documents can be displayed on the same "combined" time-space. Although, it might be desirable to separate each arrays of documents using a distinct timescale, for ease of use of the interface or for programming purpose, to group arrays of documents either using similar linear timescale or non-linear timescale. This grouping can also be made on the basis of the timescale used to distribute the documents 10 on the arrays of documents. Each group of arrays of documents will define a time-space because they all commonly share either the linearity of the timeline or they share the same unit of time length and can therefore share the time marks 204. This also allows a user to change the strength of the zoom (zoom-in/zoom-out) on only one time-space at the time, change the size of the documents, navigate through time 202 on a single time-space while the other time-spaces (or a single array of documents defining its own time-space) are kept still.

The use of various time-space can be made on a single display or on a plurality of displays. For example, each display could present a single time-space and navigate the arrays of documents more consistently. In the case where more than one time-space is displayed on a single display then they can appear with a gap therebetween, in different windows or simply using alternate views where each view displays one time-space at the time and the switch between the views is made by actuating an icon or a predetermined set of keys on a keyboard.

The description and the drawings that are presented above are meant to be illustrative of the present invention. They are not meant to be limiting of the scope of the present invention. Modifications to the embodiments described may be made without departing from the present invention, the scope of which is defined by the following claims:

The invention claimed is:

1. A method of presenting axes of documents along timelines on a display, the method comprising:

providing a plurality of documents;
displaying, on a display with a first time-space, a first subset of documents from the plurality of documents based on a first attribute, the documents of the first subset being displayed along a first axis of documents adjacently displaying documents in a rectilinear fashion on the display along a chronological order including a first timeline, the first axis locating the documents displayed thereon along the chronological order over a plurality of time units;
displaying, on the display with a second time-space, a second subset of documents from the plurality of documents based on a second attribute, the documents of the second subset being displayed along a second axis of documents adjacently displaying documents in a rectilinear fashion on the display along the chronological order including a second timeline, the second axis locating the documents displayed thereon along the chronological order over a plurality of time units, wherein the second timeline includes a non-linear timescale and a time distribution that is substantially variable, with unequal lengths of time being visually represented with equal lengths of distance along the second axis of documents; and
displaying, on the display with a third time-space, a third subset of documents from the plurality of documents based on a third attribute, the documents of the third subset being displayed along a third axis of documents adjacently displaying documents in a rectilinear fashion on the display along the chronological order including a third timeline, the third axis locating the documents displayed thereon along the chronological order over a plurality of time units, wherein the third timeline includes a non-linear timescale and a time distribution that is substantially variable, with unequal lengths of time being visually represented with equal lengths of distance along the third axis of documents, wherein the units of time of the third time-space are chronologically shorter than the units of time of the second time-space and the units of time of the second time-space are chronologically shorter than the units of time of the first time-space, and wherein at least one unit of time is absent from the second timeline of the second axis of documents, and at least one unit of time is absent from the third timeline of the third axis of documents.

2. The method of claim 1, wherein the units of time of the first time-space are years, the units of time of the second time-space are months, and the units of time of the third time-space are days.

3. The method of claim 1, wherein the first time-space includes a non-linear timescale and a time distribution that is substantially variable, with unequal lengths of time being visually represented with equal lengths of distance along the first axis of documents.

4. The method of claim 1, further comprising a fourth subset of documents displayed on an axis that is orthogonally located in respect of the first axis.

5. The method of claim 1, wherein at least some of the documents are pictures.

6. The method of claim 1, wherein the first axis, the second axis and the third axis are displayed vertically on the display.

7. The method of claim 1, wherein the documents are displayed with a plurality of sizes along one of the axes.

8. A non-transitory computer-readable medium having stored thereon computer-readable instructions that, when executed by a computer, cause the computer to perform operations for displaying axes of documents on a display, the operations comprising:
providing a plurality of documents;
displaying, on a display with a first time-space, a first subset of documents from the plurality of documents based on a first attribute, the documents of the first subset being displayed along a first axis of documents adjacently displaying documents in a rectilinear fashion on the display along a chronological order including a first timeline, the first axis locating the documents displayed thereon along the chronological order over a plurality of time units;
displaying, on the display with a second time-space, a second subset of documents from the plurality of documents based on a second attribute, the documents of the second subset being displayed along a second axis of documents adjacently displaying documents in a rectilinear fashion on the display along the chronological order including a second timeline, the second axis locating the documents displayed thereon along the chronological order over a plurality of time units, wherein the second timeline includes a non-linear timescale and a time distribution that is substantially variable, with unequal lengths of time being visually represented with equal lengths of distance along the second axis of documents; and
displaying, on the display with a third time-space, a third subset of documents from the plurality of document based on a third attribute, the documents of the third subset being displayed along a third axis of documents adjacently displaying documents in a rectilinear fashion on the display along the chronological order including a third timeline, the third axis locating the documents displayed thereon along the chronological order over a plurality of time units, wherein the third timeline includes a non-linear timescale and a time distribution that is substantially variable, with unequal lengths of time being visually represented with equal lengths of distance along the third axis of documents, wherein the units of time of the third time-space are chronologically shorter than the units of time of the second time-space and the units of time of the second time-space are chronologically shorter than the units of time of the first time-space, and wherein at least one unit of time is absent from the second timeline of the second axis of documents and at least one unit of time is absent from the third timeline of the third axis of documents.

9. The non-transitory computer-readable medium of claim 8, wherein the units of time of the first time-space are years, the units of time of the second time-space are months, and the units of time of the third time-space are days.

10. The non-transitory computer-readable medium of claim 8, wherein the first time-space includes a non-linear timescale and a time distribution that is substantially variable, with unequal lengths of time being visually represented with equal lengths of distance along the first axis of documents.

11. The non-transitory computer-readable medium of claim 8, further comprising a fourth subset of documents displayed on an axis that is orthogonally located in respect of the first axis.

12. The non-transitory computer-readable medium of claim 8, wherein at least some of the documents are pictures.

13. The non-transitory computer-readable medium of claim 8, wherein the first axis, the second axis and the third axis are displayed vertically on the display.

14. The non-transitory computer-readable medium of claim 8, wherein the documents are displayed with a plurality of sizes along one of the axes.

15. A mobile device comprising:
a processor;
a display;
a non-transitory computer-readable medium having stored thereon computer-readable instructions configured to be executed by the processor for performing a method of displaying documents on the display using a user interface, the user interface configured to:
display, on the display with a first time-space, a first subset of documents from a plurality of documents based on a first attribute, the documents of the first subset being displayed along a first axis of documents adjacently displaying documents in a rectilinear fashion on the display along a chronological order including a first timeline, the first axis locating the documents displayed thereon along the chronological order over a plurality of time units;
display, on the display with a second time-space, a second subset of documents from the plurality of documents based on a second attribute, the documents of the second subset being displayed along a second axis of documents adjacently displaying documents in a rectilinear fashion on the display along the chronological order including a second timeline, the second axis locating the documents displayed thereon along the chronological order over a plurality of time units, wherein the second timeline includes a non-linear timescale and a time distribution that is substantially variable, with unequal lengths of time being visually represented with equal lengths of distance along the second axis of documents; and
display, on the display with a third time-space, a third subset of documents from the plurality of documents based on a third attribute, the documents of the third subset being displayed along a third axis of documents adjacently displaying documents in a rectilinear fashion on the display along the chronological order including a third timeline, the third axis locating the documents displayed thereon along the chronological order over a plurality of time units, wherein the third timeline including a non-linear timescale and a time distribution that is substantially variable, with unequal lengths of time being visually represented with equal lengths of distance along the third axis of documents, wherein the units of time of the third time-space are chronologically shorter than the units of time of the second time-space and the units of time of the second time-space are chronologically shorter than the units of time of the first time-space, and wherein at least one unit of time is absent from the second timeline of the second axis of documents and at least one unit of time is absent from the third timeline of the third axis of documents.

16. The mobile device of claim 15, wherein the units of time of the first time-space are years, the units of time of the second time-space are months, and the units of time of the third time-space are days.

17. The mobile device of claim 15, wherein the first time-space includes a non-linear timescale and a time distribution that is substantially variable, with unequal lengths of time being visually represented with equal lengths of distance along the first axis of documents.

18. The mobile device of claim 15, further comprising a fourth subset of documents displayed on an axis that is orthogonally located in respect of the first axis.

19. The mobile device of claim 15, wherein at least some of the documents are pictures.

20. The non-transitory computer-readable medium of claim 15, wherein the first axis, the second axis and the third axis are displayed vertically on the display.

\* \* \* \* \*